United States Patent
Song et al.

(10) Patent No.: US 10,565,123 B2
(45) Date of Patent: Feb. 18, 2020

(54) HYBRID LOGICAL TO PHYSICAL ADDRESS TRANSLATION FOR NON-VOLATILE STORAGE DEVICES WITH INTEGRATED COMPUTE MODULE

(71) Applicant: Western Digital Technologies, Inc., San Jose, CA (US)

(72) Inventors: Seung-Hwan Song, San Jose, CA (US); Arup De, San Jose, CA (US); Pankaj Mehra, San Jose, CA (US); Brian W. O'Krafka, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/726,313

(22) Filed: Oct. 5, 2017

(65) Prior Publication Data
US 2018/0293174 A1 Oct. 11, 2018

Related U.S. Application Data

(60) Provisional application No. 62/483,818, filed on Apr. 10, 2017.

(51) Int. Cl.
G06F 12/1009 (2016.01)
G06F 12/02 (2006.01)

(52) U.S. Cl.
CPC ...... *G06F 12/1009* (2013.01); *G06F 12/0246* (2013.01); *G06F 2212/1008* (2013.01);
(Continued)

(58) Field of Classification Search
CPC ......... G06F 12/1009; G06F 2212/1008; G06F 2212/657; G06F 12/0246; G06F 2212/7201; G06F 2212/1024
See application file for complete search history.

(56) References Cited

U.S. PATENT DOCUMENTS 6,134,631 A * 10/2000 Jennings, III .......... H04N 19/61
348/266
6,401,185 B1 6/2002 Sexton
(Continued)

OTHER PUBLICATIONS

PCT International Search Report dated Jun. 11, 2018, PCT Patent Application No. PCT/US2018/020152.
(Continued)

*Primary Examiner* — David Yi
*Assistant Examiner* — Alan Otto
(74) *Attorney, Agent, or Firm* — Vierra Magen Marcus LLP

(57) ABSTRACT

A host compiles code to perform a set of one or more database operations on target and embeds an indication of whether the target data is randomly accessed data or sequentially accessed data. The compiled code is transmitted to the compute engine inside a memory system that maintains a first portion of memory for storing sequentially accessed data and a second portion of memory for storing randomly accessed data. The memory system (e.g. SSD) maintains reduced size L2P tables in volatile working memory by maintaining coarse L2P tables in the working memory for use with sequentially accessed data and maintaining fine L2P tables in the working memory for use with randomly accessed data. The compute engine uses the compiled code to perform the set of one or more database operations on the target data using the working memory.

19 Claims, 31 Drawing Sheets

(52) U.S. Cl.
CPC ............... *G06F 2212/1024* (2013.01); *G06F 2212/657* (2013.01); *G06F 2212/7201* (2013.01)

(56) References Cited

U.S. PATENT DOCUMENTS

| | | |
|---|---|---|
| 6,446,062 B1 | 9/2002 | Levine |
| 6,549,977 B1 | 4/2003 | Horst |
| 6,856,556 B1 | 2/2005 | Hajeck |
| 7,055,015 B2 | 5/2006 | Shiota |
| 7,126,857 B2 | 10/2006 | Hajeck |
| 7,424,478 B2 | 9/2008 | Licon |
| 7,430,136 B2 | 9/2008 | Merry, Jr. |
| 7,447,807 B1 | 11/2008 | Merry |
| 7,502,256 B2 | 3/2009 | Merry, Jr. |
| 7,509,441 B1 | 3/2009 | Merry |
| 7,596,643 B2 | 9/2009 | Merry, Jr. |
| 7,653,778 B2 | 1/2010 | Merry, Jr. |
| 7,685,337 B2 | 3/2010 | Merry, Jr. |
| 7,685,338 B2 | 3/2010 | Merry, Jr. |
| 7,685,374 B2 | 3/2010 | Diggs |
| 7,733,712 B1 | 6/2010 | Walston |
| 7,765,373 B1 | 7/2010 | Merry |
| 7,774,575 B2 | 8/2010 | Seto |
| 7,898,855 B2 | 3/2011 | Merry, Jr. |
| 7,912,991 B1 | 3/2011 | Merry |
| 7,936,603 B2 | 5/2011 | Merry, Jr. |
| 7,962,792 B2 | 6/2011 | Diggs |
| 8,078,918 B2 | 12/2011 | Diggs |
| 8,090,899 B1 | 1/2012 | Syu |
| 8,095,851 B2 | 1/2012 | Diggs |
| 8,108,692 B1 | 1/2012 | Merry |
| 8,122,185 B2 | 2/2012 | Merry, Jr. |
| 8,127,048 B1 | 2/2012 | Merry |
| 8,135,903 B1 | 3/2012 | Kan |
| 8,151,020 B2 | 4/2012 | Merry, Jr. |
| 8,161,227 B1 | 4/2012 | Diggs |
| 8,166,245 B2 | 4/2012 | Diggs |
| 8,243,525 B1 | 8/2012 | Kan |
| 8,254,172 B1 | 8/2012 | Kan |
| 8,255,661 B2 | 8/2012 | Karr |
| 8,261,012 B2 | 9/2012 | Kan |
| 8,296,625 B2 | 10/2012 | Diggs |
| 8,312,207 B2 | 11/2012 | Merry, Jr. |
| 8,316,176 B1 | 11/2012 | Phan |
| 8,341,339 B1 | 12/2012 | Boyle |
| 8,370,602 B2 | 2/2013 | Chen |
| 8,375,151 B1 | 2/2013 | Kan |
| 8,392,635 B2 | 3/2013 | Booth |
| 8,397,107 B1 | 3/2013 | Syu |
| 8,407,449 B1 | 3/2013 | Colon |
| 8,423,722 B1 | 4/2013 | Deforest |
| 8,433,858 B1 | 4/2013 | Diggs |
| 8,443,167 B1 | 5/2013 | Fallone |
| 8,447,920 B1 | 5/2013 | Syu |
| 8,458,435 B1 | 6/2013 | Rainey, III |
| 8,478,930 B1 | 7/2013 | Syu |
| 8,489,854 B1 | 7/2013 | Colon |
| 8,503,237 B1 | 8/2013 | Horn |
| 8,521,972 B1 | 8/2013 | Boyle |
| 8,549,236 B2 | 10/2013 | Diggs |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu |
| 8,612,804 B1 | 12/2013 | Kang |
| 8,615,681 B2 | 12/2013 | Horn |
| 8,634,247 B1 | 1/2014 | Sprouse |
| 8,638,602 B1 | 1/2014 | Horn |
| 8,639,872 B1 | 1/2014 | Boyle |
| 8,683,113 B2 | 3/2014 | Abasto |
| 8,700,834 B2 | 4/2014 | Horn |
| 8,700,950 B1 | 4/2014 | Syu |
| 8,700,951 B1 | 4/2014 | Call |
| 8,706,985 B1 | 4/2014 | Boyle |
| 8,707,104 B1 | 4/2014 | Jean |
| 8,713,066 B1 | 4/2014 | Lo |
| 8,713,357 B1 | 4/2014 | Jean |
| 8,719,531 B2 | 5/2014 | Strange |
| 8,724,422 B1 | 5/2014 | Agness |
| 8,725,931 B1 | 5/2014 | Kang |
| 8,745,277 B2 | 6/2014 | Kan |
| 8,751,728 B1 | 6/2014 | Syu |
| 8,769,190 B1 | 7/2014 | Syu |
| 8,769,232 B2 | 7/2014 | Suryabudi |
| 8,773,909 B2 | 7/2014 | Li |
| 8,775,720 B1 | 7/2014 | Meyer |
| 8,780,632 B2 | 7/2014 | Sprouse |
| 8,780,634 B2 | 7/2014 | Li |
| 8,782,327 B1 | 7/2014 | Kang |
| 8,788,778 B1 | 7/2014 | Boyle |
| 8,788,779 B1 | 7/2014 | Horn |
| 8,788,880 B1 | 7/2014 | Gosla |
| 8,793,429 B1 | 7/2014 | Call |
| 8,817,541 B2 | 8/2014 | Li |
| 8,838,936 B1 | 9/2014 | Salessi |
| 8,949,568 B2 | 2/2015 | Wei |
| 9,330,143 B2 | 5/2016 | Obukhov |
| 9,348,758 B2 | 5/2016 | Pignatelli |
| 2002/0116457 A1 | 8/2002 | Eshleman |
| 2002/0178328 A1 | 11/2002 | Honda |
| 2004/0225831 A1 | 11/2004 | Pail |
| 2006/0143238 A1 | 6/2006 | Tamatsu |
| 2007/0204128 A1 | 8/2007 | Lee |
| 2008/0071785 A1 | 3/2008 | Kabra |
| 2008/0140918 A1 | 6/2008 | Sutardja |
| 2008/0183955 A1 | 7/2008 | Yang |
| 2009/0138654 A1 | 5/2009 | Sutardja |
| 2009/0288101 A1 | 11/2009 | Gandin |
| 2010/0174849 A1 | 7/2010 | Walston |
| 2010/0250793 A1 | 9/2010 | Suy |
| 2011/0099323 A1 | 4/2011 | Syu |
| 2011/0283048 A1 | 11/2011 | Feldman |
| 2011/0283049 A1 | 11/2011 | Kang |
| 2011/0296440 A1 | 12/2011 | Laurich |
| 2012/0179869 A1 | 7/2012 | Flynn |
| 2012/0221534 A1 | 8/2012 | Gao |
| 2012/0260020 A1 | 10/2012 | Suryabudi |
| 2012/0278531 A1 | 11/2012 | Horn |
| 2012/0284460 A1 | 11/2012 | Guda |
| 2012/0324191 A1 | 12/2012 | Strange |
| 2013/0132638 A1 | 5/2013 | Horn |
| 2013/0145106 A1 | 6/2013 | Kan |
| 2013/0290793 A1 | 10/2013 | Booth |
| 2014/0006898 A1* | 1/2014 | Sharon ............... H03M 13/356 714/755 |
| 2014/0059405 A1 | 2/2014 | Syu |
| 2014/0082323 A1 | 3/2014 | Li |
| 2014/0101369 A1 | 4/2014 | Tomlin |
| 2014/0115427 A1 | 4/2014 | Lu |
| 2014/0133220 A1 | 5/2014 | Danilak |
| 2014/0136753 A1 | 5/2014 | Tomlin |
| 2014/0149826 A1 | 5/2014 | Lu |
| 2014/0157078 A1 | 6/2014 | Danilak |
| 2014/0181432 A1 | 6/2014 | Horn |
| 2014/0215129 A1 | 7/2014 | Kuzmin |
| 2014/0223255 A1 | 8/2014 | Lu |
| 2015/0106574 A1* | 4/2015 | Jayasena ............. G06F 15/7821 711/154 |
| 2015/0143028 A1 | 5/2015 | Jung |
| 2015/0143029 A1* | 5/2015 | Sivasankaran ......... G06F 3/061 711/103 |
| 2017/0177497 A1 | 6/2017 | Chun |

OTHER PUBLICATIONS

PCT Written Opinion of the International Searching Authority dated Jun. 11, 2018, PCT Patent Application No. PCT/US2018/020152.
International Search Report and Written Opinion dated Jan. 27, 2015, PCT Serial No. PCT/US2014/062066, 9 pages.
Sungchan Kim, et al., "Fast, Energy Efficient Scan inside Flash Memory SSDs," The Second International Workshop on Acceler-

(56) References Cited

OTHER PUBLICATIONS ating Data Management Systems using Modern Processor and Storage Architecture (ADMS' 11), 2011, pp. 1-8.

De, et al., "Minerva: Accelerating Data Analysis in Next-Generation SSDs," FCCM '13 Proceedings of the 2013 IEEE 21st Annual International Symposium on Field-Programmable Custom Computing Machines, pp. 9-16, Apr. 28-30 2013.

Ki, "In-Storage Compute: an Ultimate Solution for Accelerating I/O-intensive Applications," Samsung Electronics, Aug. 13, 2015.

Tiwari, et al., "Active Flash: Towards Energy-Efficient, In-Situ Data Analytics on Extreme-Scale Machines," FAST'13 Proceedings of the 11th USENIX conference on File and Storage Technologies, pp. 119-132, San Jose, CA, Feb. 12-15, 2013.

Tseng, et al., "Morpheus: Creating Application Objects Efficiently for Heterogeneous Computing," ISCA '16 Proceedings of the 43rd International Symposium on Computer Architecture, pp. 53-65, Seoul, Republic of Korea, Jun. 18-22, 2016.

Park, et al., "CFTL: An Adaptive Hybrid Flash Translation Layer with Efficient Caching Strategies," IEEE Transaction on Computers, Sep. 2011.

Lee, et al., "A Case for Flash Memory SSD in Enterprise Database Applications," Proceedings of the 2008 ACM SIGMOD international conference on Management of data, pp. 1075-1086, Jun. 9-12, 2008.

\* cited by examiner

Fine-Grained (Page Based) Mapping in a Presistent Menmory that Has 16 Different Map Entries (16 physical pages or 2 block in total, 2 sub blocks/block, 4 pages/sub-block)

Direct Mapping

| Logical Sub-Block Address | Physical Sub-Block Address |
|---|---|
| 15 | 15 |
| 14 | 14 |
| 13 | 13 |
| 12 | 12 |
| 11 | 11 |
| 10 | 10 |
| 9 | 9 |
| 8 | 8 |
| 7 | 7 |
| 6 | 6 |
| 5 | 5 |
| 4 | 4 |
| 3 | 3 |
| 2 | 2 |
| 1 | 1 |
| 0 | 0 |

FIG. 26 (Cont.)

| Logical Sub-Block Address | Physical Sub-Block Address |
|---|---|
| 15 | 7 |
| 14 | 6 |
| 13 | 5 |
| 12 | 4 |
| 11 | 3 |
| 10 | 2 |
| 9 | 1 |
| 8 | 0 |
| 7 | 15 |
| 6 | 14 |
| 5 | 13 |
| 4 | 12 |
| 3 | 11 |
| 2 | 10 |
| 1 | 9 |
| 0 | 8 |

FIG. 26 (Cont.)

HYBRID LOGICAL TO PHYSICAL ADDRESS TRANSLATION FOR NON-VOLATILE STORAGE DEVICES WITH INTEGRATED COMPUTE MODULE

This application claims the benefit of U.S. Provisional Application 62/483,818, "Hybrid Logical To Physical Address Translation For Non-Volatile Storage Devices With Integrated Compute Module," filed on Apr. 10, 2017, incorporated herein by reference in its entirety.

BACKGROUND

Non-volatile semiconductor memory is used in solid state drives (SSD). As Internet-scale services continue to grow, real time data processing and data analytics by ad-hoc queries on large volumes of data is emerging as a critical application. Additionally, as memory density continues to scale, SSD capacities continue to scale exponentially. Current enterprise systems are ill-equipped to manage these trends as they rely on moving huge volumes of data out of the SSD and into a host system's main memory for processing. These solutions rely on storing data at one location (i.e. a storage device like a SSD) and move data to a different location (typically DRAM of the host) for computation. While this method works for some applications with limited data sizes, applications with large scale data cannot use this method because of the time wasted on transferring data and the prohibitively high cost and power consumption of including large scale (e.g. petabyte) DRAM capacity in such systems.

BRIEF DESCRIPTION OF THE DRAWINGS

Like-numbered elements refer to common components in the different figures.

DETAILED DESCRIPTION

Figure 1:
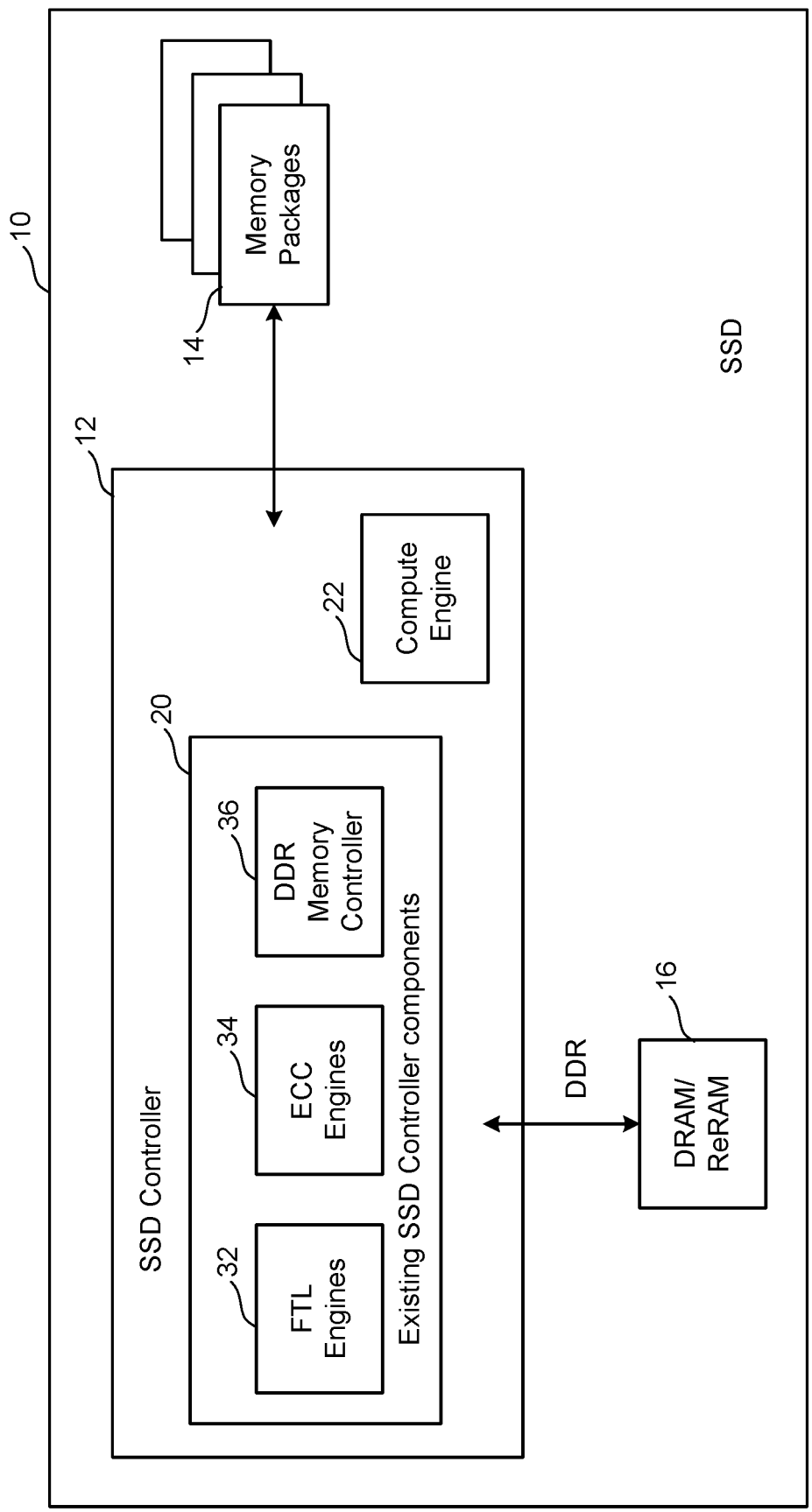
FIG. 1 is a block diagram of one embodiment of a solid state drive that comprises a Controller, non-volatile memory for storing data and a compute engine near the location of the data that can be used to perform common data manipulation operations.

A solid state drive ("SSD"), or other memory system, is proposed that can accelerate performance of big data applications using a hardware accelerator based approach that involves integrating compute engines inside the SSD (or other memory system) to perform common data manipulation operations such as scan, filter, aggregate, and join (and other operations). Application Programming Interfaces ("APIs") can be exposed by the memory system (e.g., exposed by the Controller) and used by the host application to perform efficient data processing using the compute engines in the SSD or other memory system.

As the compute operations move closer to the data, the available compute-to-data bandwidth increases significantly. For example, compared to conventional systems where compute is located on the host side of the I/O interface (and outside the SSD), integrating the compute engine within a SSD can provide 1.5×-3.75× higher bandwidth, even as NAND architecture and I/O interfaces continue to scale. Similarly, even closer integration with the bits—by moving the compute engine within a memory die—can provide an additional 2.5×-13× increase in bandwidth available to the compute engine.

A compute engine is a hardware circuit that can be one or more of the following:

1. Hardware accelerator for data access and manipulation operations such as filtering, aggregation, compression/decompression, sorting, grouping, and joining tabular or other forms of data;
2. General purpose CPU core such as ARM/ARC/Intel Atom; and/or
3. Reconfigurable hardware circuitry such as FPGAs.

Unlike other components in an SSD that primarily facilitate reading/writing data from/to the SSD, a compute engine (which is separate from a controller) manipulates the contents of the data. For example, it can search a stream of data looking for a specific key (a set of bytes) or can sort the data in some order as specified by the host. The concept of compute engines includes but is not limited to compression/decompression engines sometimes available in SSDs.

Typical memory systems include a controller, non-volatile storage connected to the controller, and local high speed volatile memory (e.g., DRAM) connected to and local to the controller. The controller can use the local high speed volatile memory (also referred to as local memory or working memory) as a read buffer, as a write buffer, as a scratch pad and to store logical address to physical address translation tables ("L2P tables").

In many systems, the non-volatile storage is addressed internally to the memory system using physical addresses associated with the one or more memory die. However, the host system will use logical addresses to address the various memory locations. This enables the host to assign data to consecutive logical addresses, while the memory system is free to store the data as it wishes among the locations of the one or more memory die. To enable this system, the controller typically performs address translation between the logical addresses used by the host and the physical addresses used by the memory die. One example implementation is to maintain tables (i.e. the L2P tables mentioned above) that identify the current translation between logical addresses (such as logical block addresses, known as LBA's) and physical addresses (such as physical block addresses, known as PBA's). An entry in the L2P table may include an identification of a logical address and corresponding physical address.

Although logical address to physical address tables (or L2P tables) include the word "tables" they need not literally be tables. Rather, the logical address to physical address tables (or L2P tables) can be any type of data structure.

In some examples, the memory space of a memory system is so large that the local memory cannot hold all of the L2P tables. In such a case, the entire set of L2P tables are stored in the non-volatile storage and a subset of the L2P tables are cached (L2P cache) in the local memory. The bigger the L2P cache, the higher performance of the memory system. In some memory systems, the L2P cache may utilize up to 95% of the local memory. Using such a large portion of the local memory is not a problem during normal operation of the memory system (e.g., during programming, erasing and reading). However, when the local compute engine (discussed above) has been engaged to perform data manipulation operations, that local compute engine needs to use a portion of the local memory as working memory to support the data manipulation operations. If 95% of the local memory is reserved for the L2P cache, then there will not be enough free memory for the compute engine and the compute engine's performance will suffer. Therefore, there is a need to reduce the amount of space (capacity) in the local memory that is reserved for the L2P cache when the local memory is needed by a compute engine, without degrading performance of the memory system.

To address this need, a non-volatile storage system is proposed that maintains reduced size logical address to physical address tables in volatile working memory by maintaining coarse logical address to physical address tables in the working memory for use with storing sequentially accessed data and storing fine logical address to physical address tables in the working memory for use with storing randomly accessed data. By maintaining reduced size logical address to physical address tables, there will be more room in the working memory for the local compute engine to use during its performance of database operations, thereby, increasing the performance (speed) of the compute engine.

One embodiment of the memory system (e.g., SSD) is connectable to (or otherwise in communication with) a host. The memory system comprises non-volatile memory (e.g., one or more memory packages including one or more memory die), a controller in communication with the non-volatile memory, working memory connected to the controller and configured to store coarse logical address to physical address tables for use with storing sequentially accessed data and fine logical address to physical address tables for use with storing randomly accessed data, and a compute engine positioned within the memory system and in communication with the controller. The compute engine is configured to receive compiled code from the host that includes instructions for performing one or more database operations on target data in the non-volatile memory and an indication of whether the target data is sequentially accessed data or randomly accessed data. The compute engine performs the one or more database operations based on the code. The target data is accessed using the coarse logical address to physical address tables if the indication denotes that the target data is sequentially accessed data and the same target data is accessed using the fine logical address to physical address tables if the indication denotes that the target data is randomly accessed data.

FIGS. 1-19 describe various architectures for memory systems that can implement the technology proposed herein. For example, FIG. 1 is a block diagram of one embodiment of SSD 10 that comprises a Controller (SSD Controller) 12, non-volatile memory packages 14 for storing data, DRAM/ReRAM 16, and a compute engine 22 near the location of the data that can be used to perform common data manipulation operations. FIG. 1 presents a high-level design where the compute engine 22 is integrated within the SSD Controller 12. The compute engine 22 can be, for instance, an ASIC that is part of the SSD Controller system on a chip ("SoC"), or can be integrated (deeper) as a hardware circuit within the SSD controller. FIG. 1 shows the SSD Controller 12, a SoC, including existing SSD Controller components that comprise FTL engines 32, ECC engines 34, and DDR memory controller 36 for controlling DRAM/ReRAM 16. Included within that SSD Controller 12 is the new proposed compute engine 22 that can be used to perform compute operations on data stored in the non-volatile memory of the memory packages. Examples of the compute operations include scanning the data, searching, filtering, sorting, aggregating data, joining data together, as well as other functions on the data. FIG. 1 shows the SSD Controller 12 in communication with DRAM/ReRAM 16 and in communication with the set of one or more memory packages 14. In one embodiment, the SSD Controller 12 communicates with the memory packages (and/or memory die) using a Toggle Mode interface, which is an asynchronous interface that is able to communicate 32 GB/s. An alternative embodiment could use ONFI interface (Open NAND Flash Interface), which is synchronous and makes use of a clock. DRAM/ReRAM 16 is one example of a local memory (e.g., high speed volatile working memory).

In the designs considered below, a memory package refers to a structure that contains one or more memory dies (e.g., NAND flash memory dies, ReRAM dies, both NAND and ReRAM, or other non-volatile technologies). The term memory package can also refer to managed memory—i.e. a memory package that contains one or more memory dies with an embedded error correction code ("ECC") engine/controller to correct errors detected during read operations to the memory.

The memory packages include one or more memory die. In one embodiment, each memory die will include its own chip enable that can be controlled by SSD Controller 12. In other embodiments, multiple memory die may share a chip enable, requiring SSD Controller 12 to use addressing to select between the memory die that share a chip enable. In one embodiment, the memory die in the memory packages 14 utilize NAND flash memory. In other embodiments, the memory package can include cross point ReRAM non-volatile memory, which is discussed below.

Figure 2:
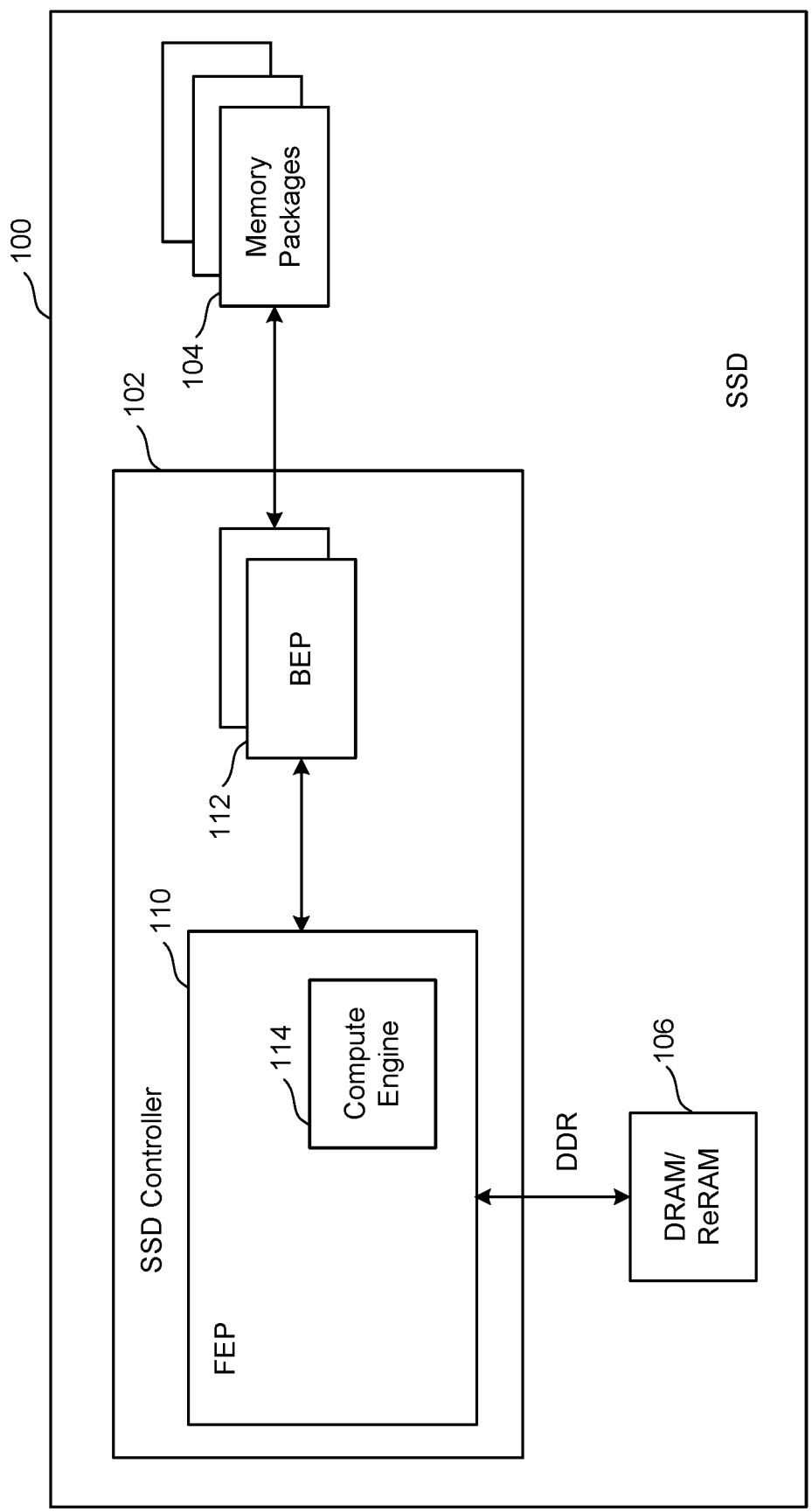
FIG. 2 is a block diagram of one embodiment of a solid state drive that comprises a Controller, non-volatile memory for storing data and a compute engine near the location of the data that can be used to perform common data manipulation operations.

FIG. 2 is a block diagram of one embodiment of a solid state drive 100 that comprises a controller 102, non-volatile memory 104 for storing data, DRAM/ReRAM 106 and a compute engine 114 near the location of the data that can be used to perform common data manipulation operations. The embodiment of FIG. 2 includes an SSD controller 102 comprising a Front End Processor Circuit (FEP) 110 and one or more Back End Processor Circuits (BEP) 112. In one embodiment the FEP110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the SSD controller 102 is manufactured as a SoC. FEP 110 and BEP 112 both include their own processors. In one embodiment, FEP110 and BEP 112 work as a master slave configuration where the FEP110 is the master and each BEP 112 is a slave. For example, FEP circuit 110 implements a flash translation layer, including performing memory management (e.g., garbage collection, wear leveling, etc.), logical to physical address translation, communication with the host, management of DRAM (local volatile memory) and management the overall operation of the SSD (or other non-volatile storage system). The BEP circuit 112 manages memory operations in the memory packages/die at the request of FEP circuit110. For example, the BEP circuit 112 can carry out the read, erase and programming processes. Additionally, the BEP circuit 112 can perform buffer management, set specific voltage levels required by the FEP circuit110, perform error correction (ECC), control the Toggle Mode interfaces to the memory packages, etc. In one embodiment, each BEP circuit 112 is responsible for its own set of memory packages. FIG. 2 shows the FEP circuit110 in communication with each of the BEP circuits 112. In the implementation of FIG. 2, the compute engine 114 is designed in as a hardware circuit within FEP110. The compute engine can access high speed, high-bandwidth memory using the DDR interface to access the DRAM 106. In this implementation, the bandwidth available to the compute engine is limited by the bandwidth that connects the FEP110 to the BEP 112. DRAM 106 is one example of a local working memory.

Figure 3:
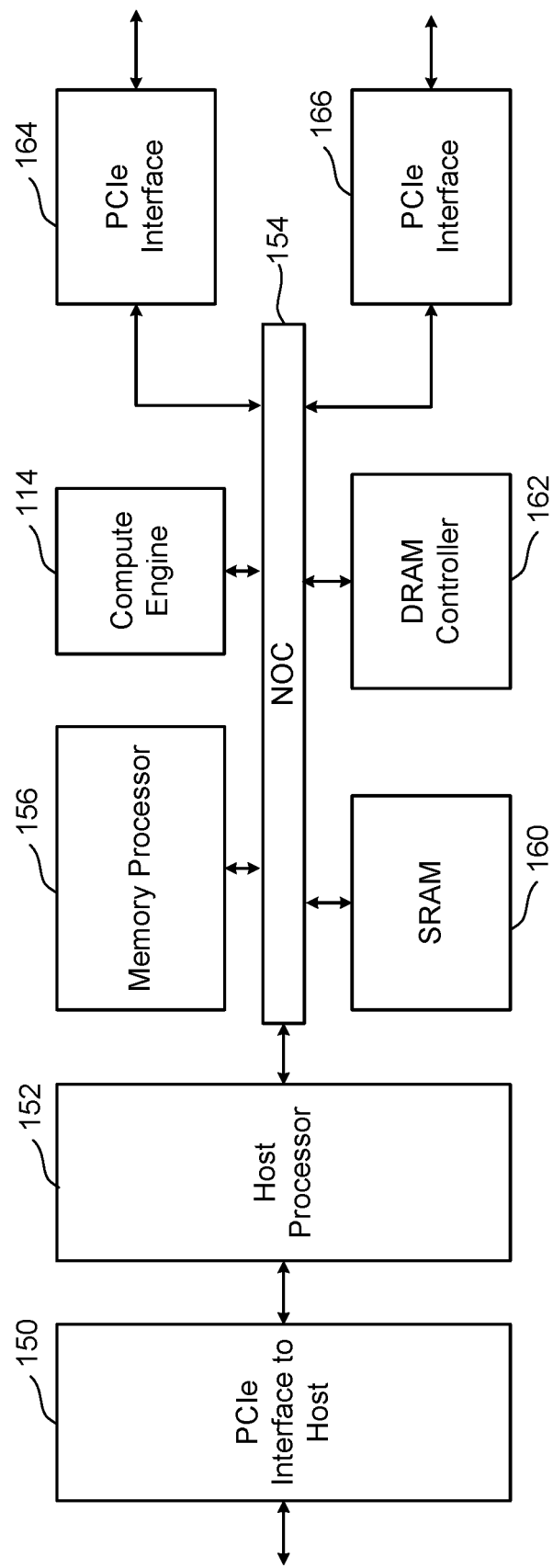
FIG. 3 is a block diagram of one embodiment of a Front End Processor Circuit with a compute engine. The Front End Processor Circuit is part of a Controller.

FIG. 3 is a block diagram of one embodiment of an FEP circuit with the compute engine 114 designed into the circuit. The FEP circuit of FIG. 3 is one example implementation of FEP circuit110 of FIG. 2. FIG. 3 shows a PCIe interface 150 to communicate with the host and a host processor 152 in communication with that PCIe interface. The host processor 152 can be any type of processes known in the art that is suitable for the implementation. The host processor 152 is in communication with a network-on-chip (NOC) 154. An NOC is a communication subsystem on an integrated circuit, typically between cores in a SoC. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, an NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, the compute engine 114, SRAM 160 and a DRAM controller 162. The DRAM controller 162 is used to operate and communicate with the DRAM (e.g., DRAM 106). SRAM 160 is local RAM memory used by the compute engine 114 or the memory processor 156. The memory processor 156 is used to run the FEP circuit and perform the various memory operations. Also in communication with the NOC are two PCIe Interfaces 164 and 166. In the embodiment of FIG. 3, the SSD controller will include two BEP circuits; therefore there are two PCIe Interfaces 164/166. Each PCIe Interface communicates with one of the BEP circuits. In other embodiments, there can be more or less than two BEP circuits; therefore, there can be more than two PCIe Interfaces. In these arrangements, the compute engine 114 is positioned (from the perspective of the host) behind the interface 150 to the host (e.g., on the memory system side of the interface to the host) and behind the API exposed by the Controller (e.g., exposed by the FEP circuit).

Figure 4:
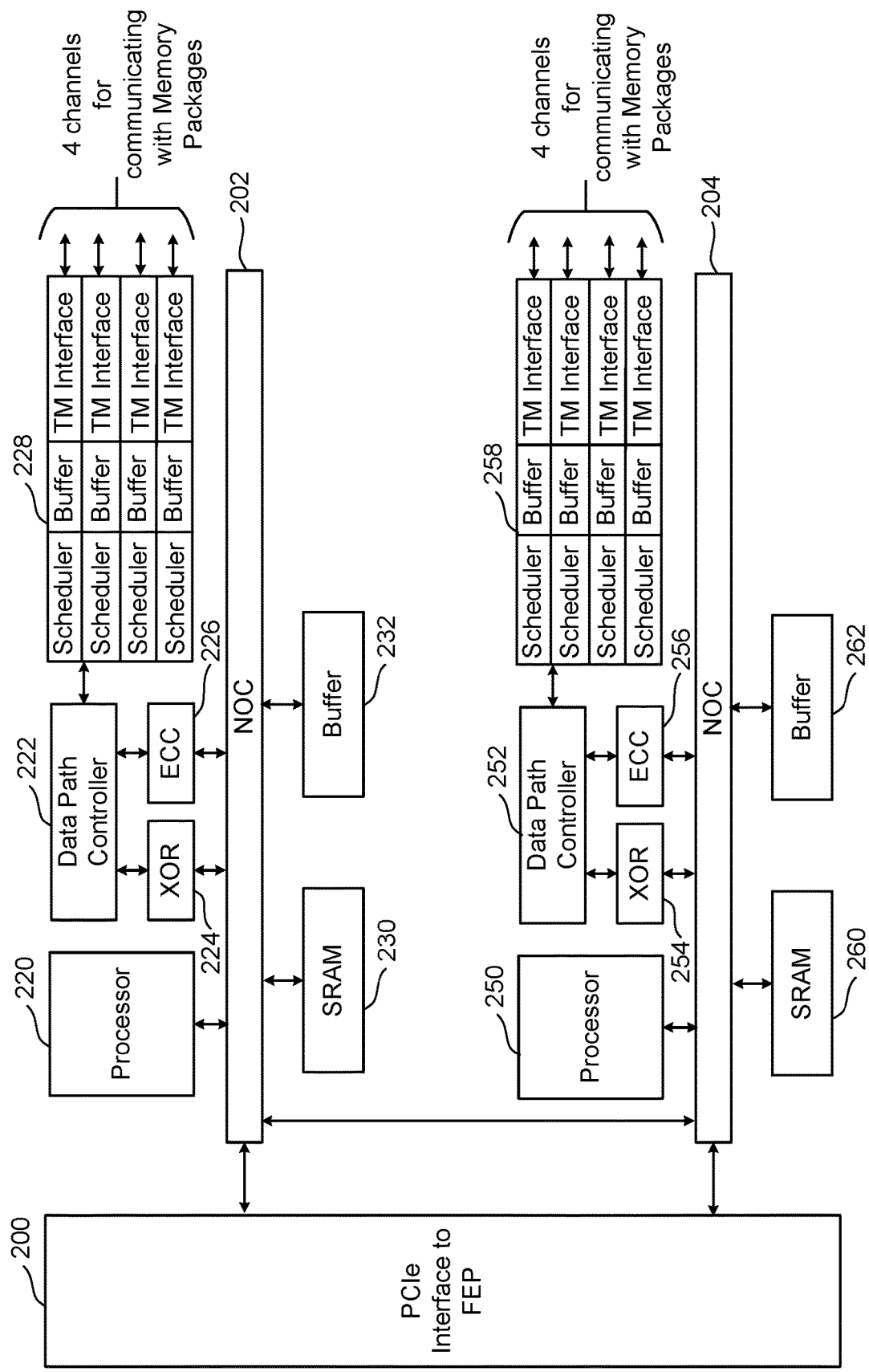
FIG. 4 is a block diagram of one embodiment of a Back End Processor Circuit. In some embodiments, the Back End Processor Circuit is part of a Controller.

FIG. 4 is a block diagram of one embodiment of the BEP circuit. The BEP circuit of FIG. 4 is one example implementation of BEP circuit 112 of FIG. 2. FIG. 4 shows a PCIe Interface 200 for communicating with the FEP circuit (e.g., communicating with one of PCIe Interfaces 164 and 166 of FIG. 3). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. The data path controller is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

Figure 5:
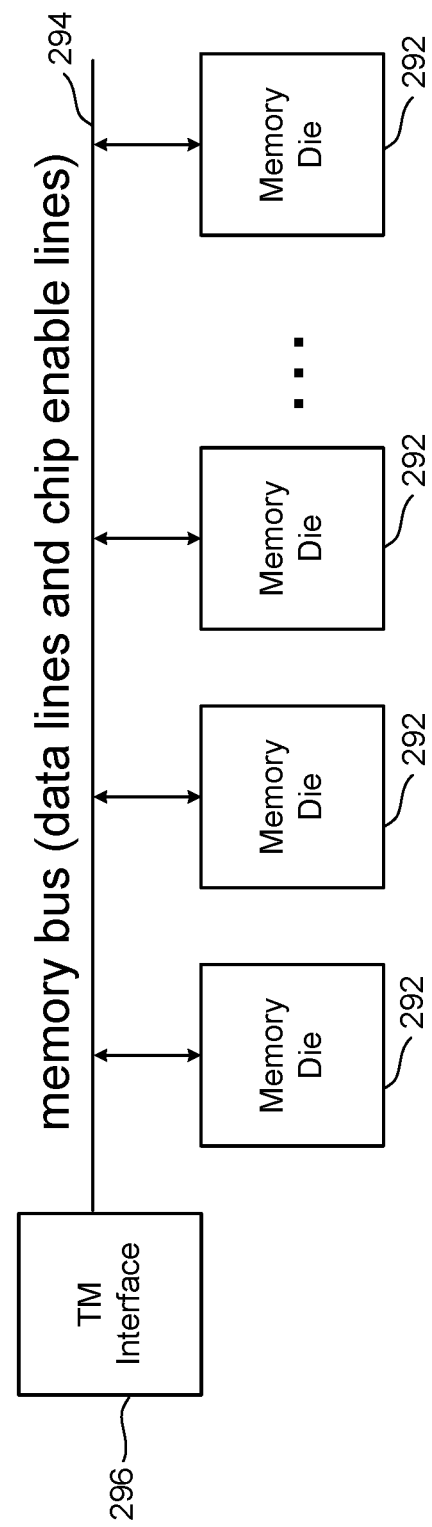
FIG. 5 is a block diagram of one embodiment of a memory package.

FIG. 5 is a block diagram of one embodiment of a memory package. For example, the memory package of FIG. 5 is an example implementation of a memory package included in memory packages 14 of FIG. 1 or memory packages 104 of FIG. 2. FIG. 5 shows a plurality of memory die 292 connected to a memory bus (data lines and chip enable lines) 294. The memory bus 294 connects to a Toggle Mode Interface 296 for communicating with the TM Interface of an BEP circuit (see e.g. FIG. 4). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 6:
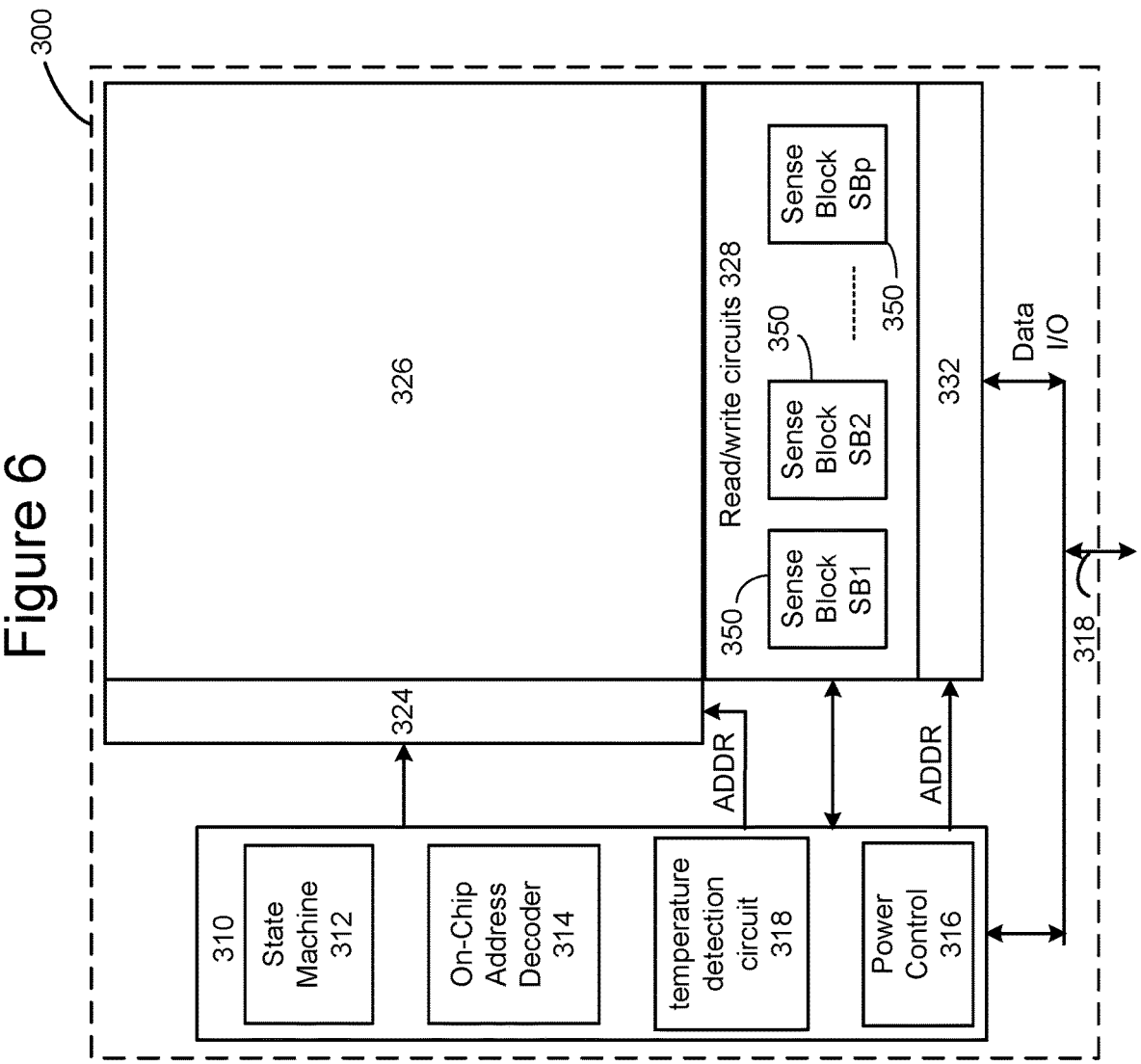
FIG. 6 is a block diagram of one embodiment of a memory die.

FIG. 6 is a functional block diagram of one embodiment of a memory die 300. Note that memory is one example implementation of memory die 292 of FIG. 5. The components depicted in FIG. 6 are electrical circuits. Memory die 300 includes a three dimensional memory structure 326 of memory cells (such as, for example, a 3D array of memory cells), control circuitry 310, and read/write circuits 328. In other embodiments, a two dimensional array of memory cells can be used. Memory structure 326 is addressable by word lines via a row decoder 324 and by bit lines via a column decoder 332. The read/write circuits 328 include multiple sense blocks 350 including SB1, SB2, . . . , SBp (sensing circuitry) and allow a page of memory cells to be read or programmed in parallel. Commands and data are transferred between to/from memory die 300 via lines 318. In one embodiment, memory die 300 includes a set of input and/or output (I/O) pins that connect to lines 318.

Memory structure 326 may comprise one or more arrays of memory cells including a 3D array. The memory structure may comprise a monolithic three dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Control circuitry 310 cooperates with the read/write circuits 328 to perform memory operations (e.g., erase, program, read, and others) on memory structure 326, and includes a state machine 312, an on-chip address decoder 314, a power control module 316 and a temperature detection circuit 318. The state machine 312 provides die-level control of memory operations. Temperature detection circuit 318 (which is on memory die 300) is configured to detect temperature at the memory structure 326, and can be any suitable temperature detection circuit known in the art. In one embodiment, state machine 312 is programmable by software. In other embodiments, state machine 312 does not use software and is completely implemented in hardware (e.g., electrical circuits). In one embodiment, control circuitry 310 includes registers, ROM fuses and other storage devices for storing default values such as base voltages and other parameters.

The on-chip address decoder 314 provides an address interface between addresses used by a host or controller to the hardware address used by the decoders 324 and 332. Power control module 316 controls the power and voltages supplied to the word lines and bit lines during memory operations. It can include drivers for word line layers (discussed below) in a 3D configuration, select transistors (e.g., SGS and SGD transistors, described below) and source lines. Power control module 316 may include charge pumps for creating voltages. The sense blocks include bit line drivers.

Multiple memory elements in memory structure 326 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors that can be used to implement memory structure 326 as a three-dimensional memory structure.

A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device in an ordered array, such as in a plurality of rows and/or columns. However, the memory elements may be arrayed in non-regular or non-orthogonal configurations, or in structures not considered arrays.

A three dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in they direction) with each column having multiple memory cells. The vertical columns may be arranged in a two dimensional configuration, e.g., in an x-y plane, resulting in a three dimensional arrangement of memory cells, with memory cells on multiple vertically stacked memory planes. Other configurations of memory elements in three dimensions can also constitute a three dimensional memory array.

By way of non-limiting example, in a three dimensional NAND memory array, the memory elements may be coupled together to form vertical NAND strings with charge-trapping material that traverse across multiple horizontal memory device levels. One example of a three dimensional NAND memory array that can be used to implement memory structure 126 can be found in U.S. Pat. No. 9,343,156, incorporated herein by reference in its entirety.

Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

A person of ordinary skill in the art will recognize that the technology described herein is not limited to a single specific memory structure, but covers many relevant memory structures within the spirit and scope of the technology as described herein and as understood by one of ordinary skill in the art.

Although an example memory system is a three dimensional memory structure that includes vertical NAND strings with charge-trapping material, other (2D and 3D) memory structures can also be used with the technology described herein. For example, floating gate memories (e.g., NAND-type and NOR-type flash memory), ReRAM memories, magnetoresistive memory (e.g., MRAM), and phase change memory (e.g., PCRAM) can also be used.

One example of a ReRAM memory includes reversible resistance-switching elements arranged in cross point arrays accessed by X lines and Y lines (e.g., word lines and bit lines). One example of a three dimensional memory array that can be used to implement memory structure 126 can be found in U.S. Patent Application 2016/0133836, "High Endurance Non-Volatile Storage," incorporated herein by reference in its entirety.

In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. This configuration is known as a spin valve and is the simplest structure for an MRAM bit. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCRAM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

Figure 7:
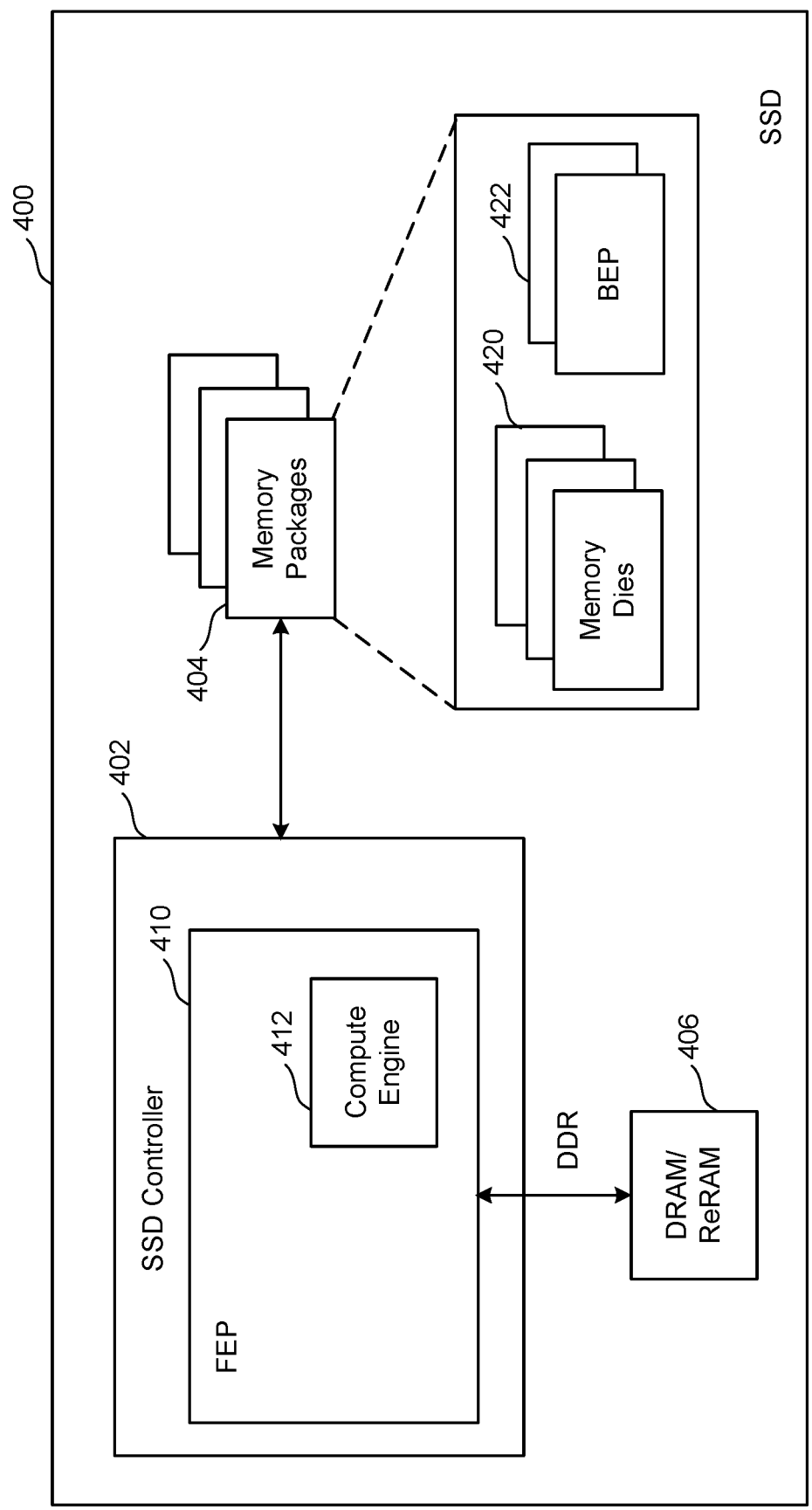
FIG. 7 is a block diagram of one embodiment of a solid state drive that comprises a Controller, non-volatile memory for storing data and a compute engine near the location of the data that can be used to perform common data manipulation operations.

FIG. 7 is a block diagram of one embodiment of a solid state drive 400 that comprises a controller 402, non-volatile memory packages 404 for storing data, DRAM/ReRAM 406, and a compute engine 412 near the location for that data that can be used to perform common data manipulation operations. Controller 402 includes FEP circuit 410. In the embodiment of FIG. 7, compute engine 412 is integrated within FEP circuit 410 and the one or more BEP circuits 422 are now incorporated within the memory packages 404. In this implementation, the SSD controller contains only one ASIC, for the FEP circuit. That is, the SSD controller 402 is in communication with the memory packages 404, where each memory package includes multiple memory die 420 and one or more BEP circuits 422. One example embodiment of memory die 420 is depicted in FIG. 6. One example of BEP circuit 422 is depicted in FIG. 4. One example of FEP circuit410 with an integrated compute engine 412 is depicted in FIG. 3. DRAM/ReRAM 406 is an example of a local memory (e.g., local high speed working volatile memory).

Figure 8:
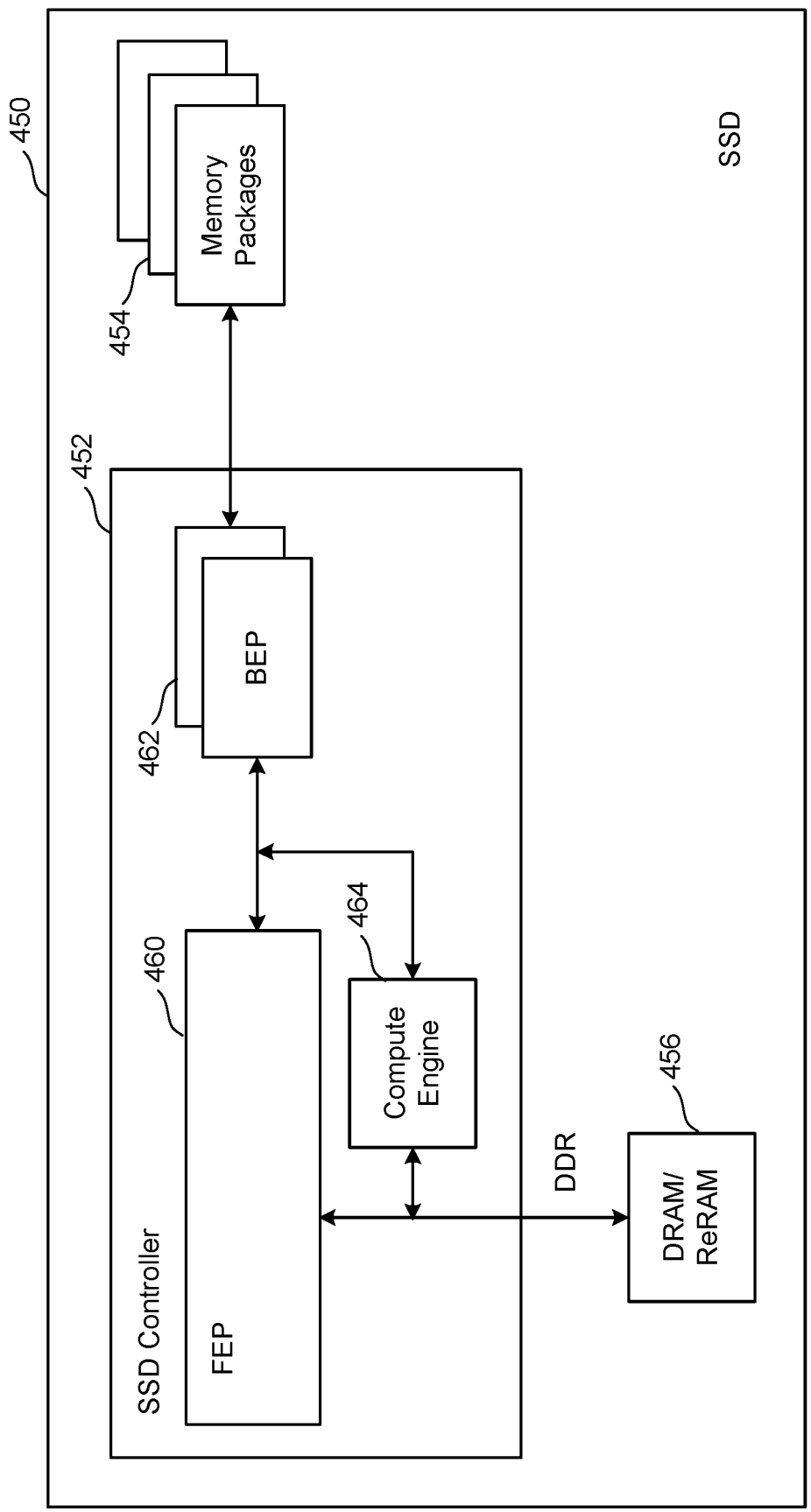
FIG. 8 is a block diagram of one embodiment of a solid state drive that comprises a Controller, non-volatile memory for storing data and a compute engine near the location of the data that can be used to perform common data manipulation operations.

FIG. 8 is a block diagram of one embodiment of a solid state drive 450 that comprises a controller 460, non-volatile memory packages 454 for storing data, DRAM/ReRAM 456, and a compute engine 464 near the location of the data that can be used to perform common data manipulation operations. In the embodiment of FIG. 8 the compute engine 464 is a standalone ASIC (application specific integrated circuit) that is integrated with the SSD controller 460 as a SoC. In this implementation, controller 460 includes a FEP circuit460 in communication with one or more BEP circuits 462. Compute engine 464 is outside of and connected to FEP circuit462, connected to the BEP circuit and connected to the high speed DRAM memory with separate interfaces. The bandwidth available to the compute engine 464 is lower than or equal to the bandwidth of the embodiment of FIG. 2. This implementation is preferred when the development of the FEP circuit462 and the compute engine 464 needs to be kept separate. One example of BEP circuit 422 is depicted in FIG. 4. One example of memory packages 454 is depicted in FIG. 5. DRAM/ReRAM 456 is an example of a local memory (e.g., local high speed volatile working memory).

Figure 9:
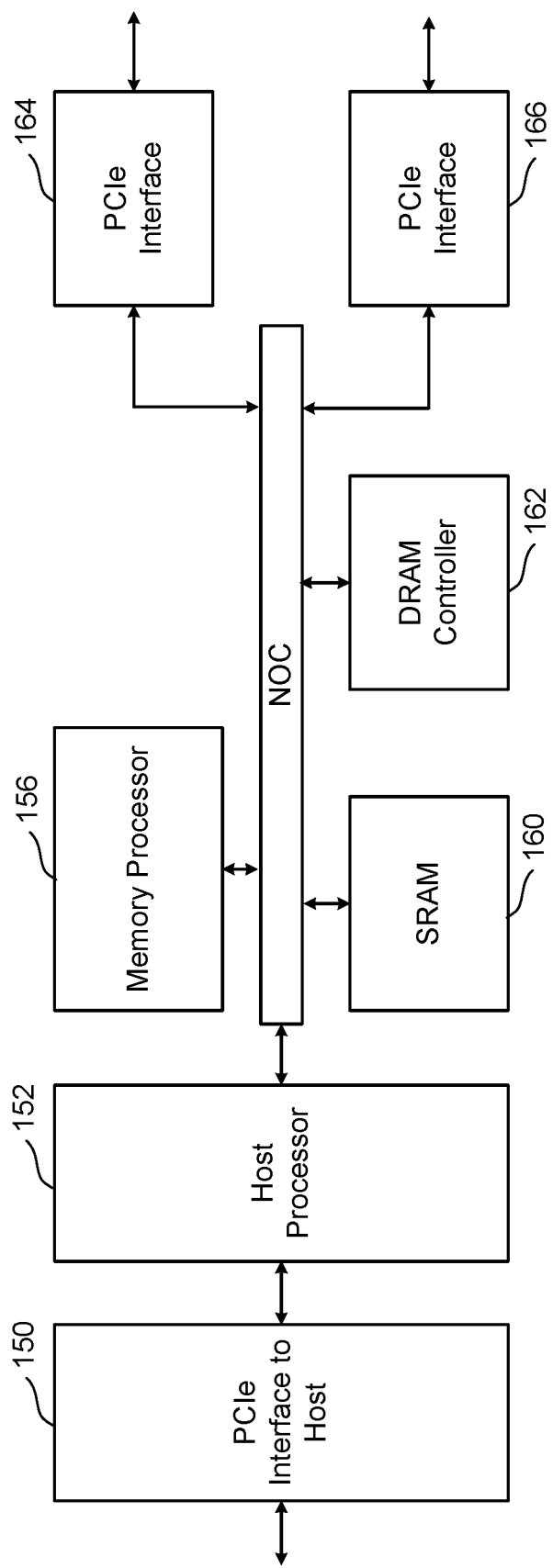
FIG. 9 is a block diagram of one embodiment of a Front End Processor Circuit without a compute engine. In some embodiments, the Front End Processor Circuit is part of a Controller.

FIG. 9 is a block diagram of one embodiment of a FEP circuit without a compute engine, that is suitable for the embodiment of FIG. 8 (e.g., FEP circuit 460). FIG. 9 shows all the components of FIG. 3, but without the compute engine. That is, FIG. 9 depicts PCIe interface 150, host processor 152, NOC 154, memory processor 156, SRAM 160, DRAM controller 162, and PCIe Interfaces 164 and 166. In the embodiment of FIG. 9, the SSD controller will include two BEP circuits; therefore there are two PCIe Interfaces. Each PCIe Interface communicates with one of the BEP circuits. In other embodiments, there can be more or less than two BEP circuits; therefore, there can be more or less than two PCIe Interfaces.

Figure 10:
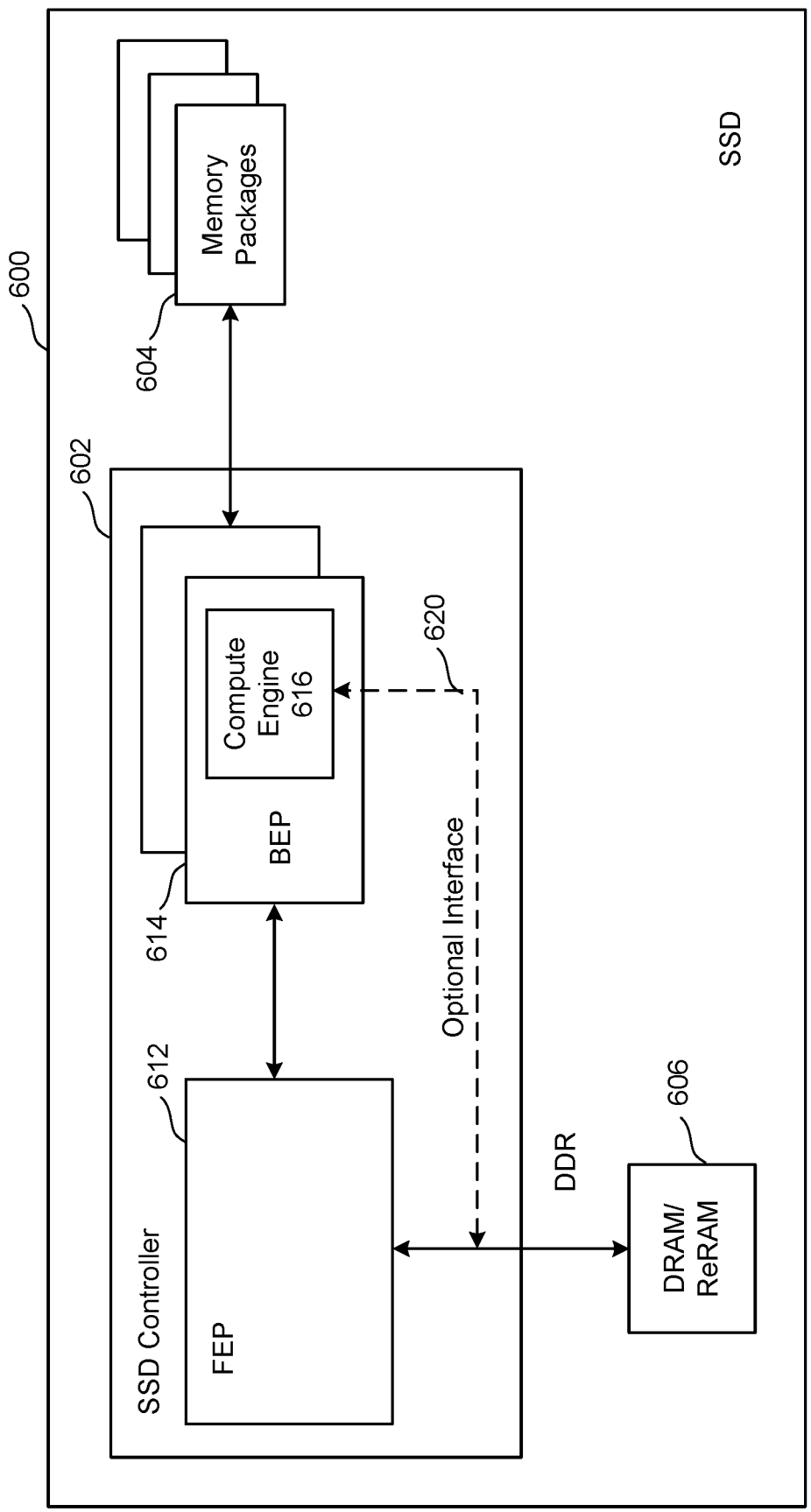
FIG. 10 is a block diagram of one embodiment of a solid state drive that comprises a Controller, non-volatile memory for storing data and a compute engine near the location of the data that can be used to perform common data manipulation operations.

FIG. 10 is a block diagram of one embodiment of a solid state drive 600 that comprises a controller 602, non-volatile memory packages 604 for storing data, DRAM/ReRAM 606, and compute engine 616 near the location of the data that can be used to perform common data manipulation operations. Controller 602 includes a FEP circuit 612 connected to one or more BEP circuits 614. In this embodiment a compute engine 616 is integrated with an BEP circuit 614. That is, the compute engine 616 is implemented in the ASIC for the BEP circuit 614. The bandwidth available to the compute engine is now determined by the number of toggle mode channels present in each BEP circuit and the bandwidth of the toggle mode channels. The BEP circuit 614 may also contain an optional interface 620 to connect to the DRAM/ReRAM chip. A direct interface to the high speed memory provides the compute engine 616 with fast access to the memory to store temporary working data. In the absence of a direct interface, temporary working data is streamed via the interface that connects the BEP circuits to the FEP circuit. One example of FEP circuit 612 is depicted in FIG. 9. One example of memory packages 604 is depicted in FIG. 5. DRAM/ReRAM 606 is an example of a local memory (e.g., local high speed volatile working memory).

Figure 11:
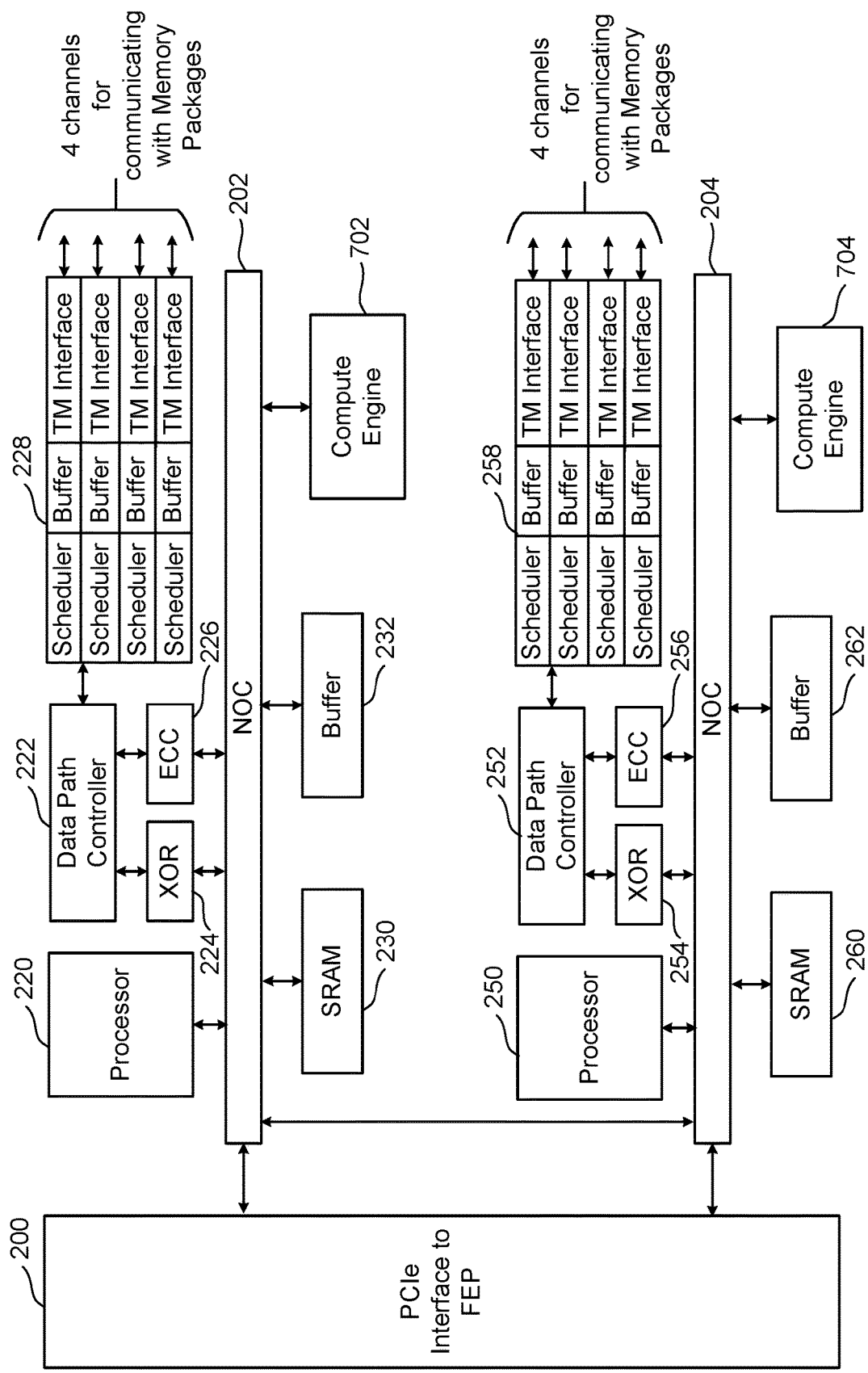
FIG. 11 is a block diagram of one embodiment of a Back End Processor Circuit with a compute engine. In some embodiments, the Back End Processor Circuit is part of a Controller.

FIG. 11 is a block diagram of one embodiment of an BEP circuit that includes a compute engine. The embodiment of the BEP circuit of FIG. 11 is appropriate for use in the embodiment of FIG. 10 (e.g., as an BEP circuit 614). The components of FIG. 11 are the same as the components of FIG. 4, but further includes a compute engine 702 connected to the top NOC 202 and a second compute engine 704 connected to the bottom NOC 204. In another embodiment, one compute engine can connect to both NOCs. In another embodiment, the two NOCs are connected together and the combined NOC will connect to one, two or multiple compute engines. In the embodiment of FIG. 11, there is one compute engine for each set of four channels. In other embodiments, the channels grouped together can include more or less than four channels.

Figure 12:
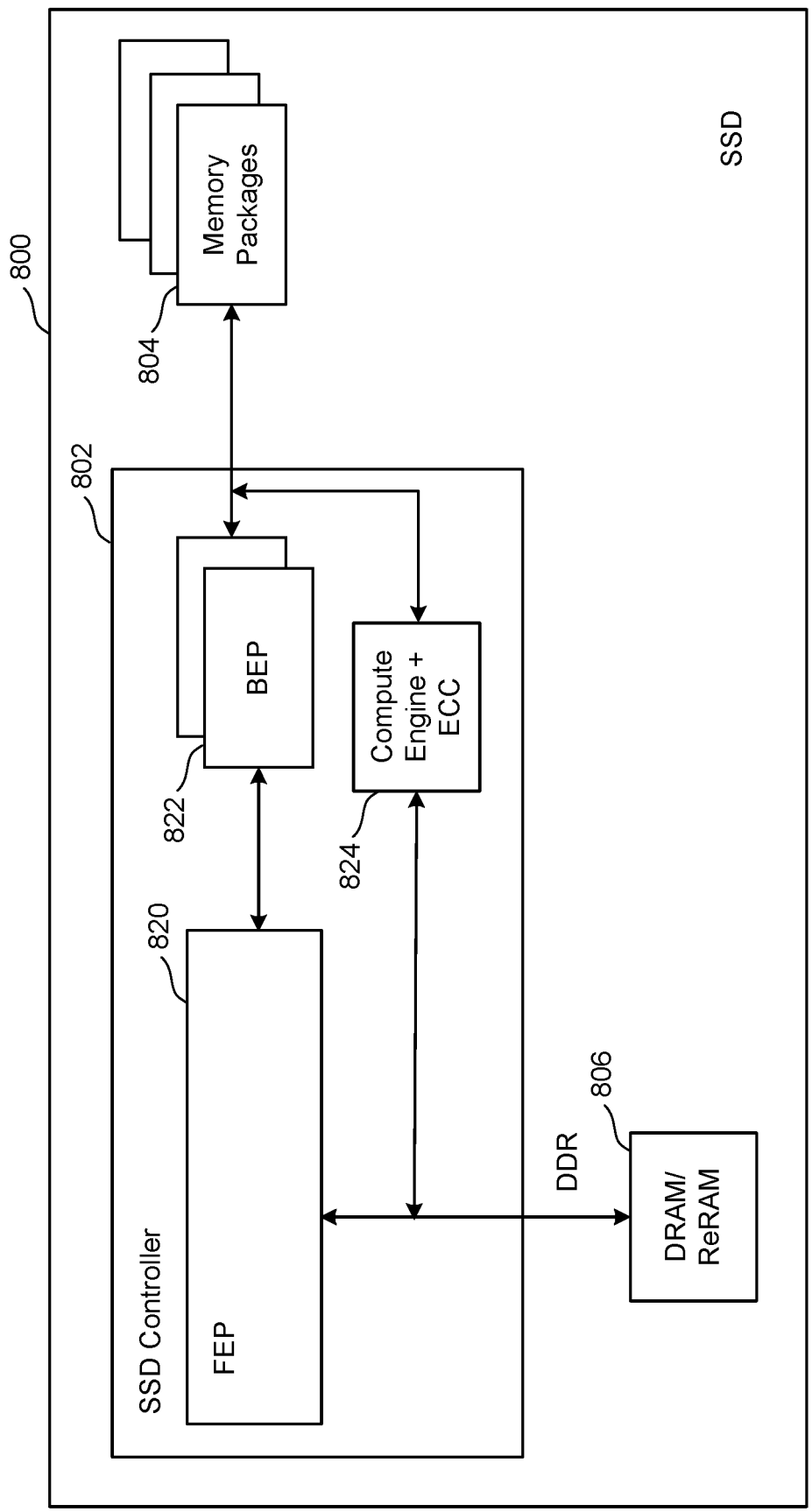
FIG. 12 is a block diagram of one embodiment of a solid state drive that comprises a Controller, non-volatile memory for storing data and a compute engine near the location of the data that can be used to perform common data manipulation operations.

FIG. 12 is a block diagram of one embodiment of a solid state drive 800 that comprises a controller 802, non-volatile memory packages 804 for storing data, DRAM/ReRAM 806 and a compute engine 824 near the location of the data that can be used to perform common data manipulation operations. Controller 802 includes FEP circuit 820 connected to one or more BEP circuits 822. In the embodiment of FIG. 12, compute engine 824 is a standalone ASIC that is connected directly to the toggle mode (TM) channels from the BEP circuits. In such implementations, the compute engine should optionally include an ECC engine in order to decode and correct data read from the flash memory (or other type of nonvolatile memory in the memory packages) before being processed by the compute engine. The compute engine 824 can also be connected to the high speed, high-bandwidth DRAM memory 806 through a standard DDR interface to the DRAM/ReRAM chip and to FEP circuit820. One example of FEP circuit820 is depicted in FIG. 9. One example of memory packages 804 is depicted in FIG. 5. One example of BEP circuit 822 is depicted in FIG. 4. DRAM/ReRAM 806 is an example of a local memory (e.g., local high speed volatile memory).

The embodiments discussed above show various implementations of integrating the compute engine with the controller. In a different set of implementations, the compute engine can be integrated with the memory package, referred to as memory package level integration.

Figure 13:
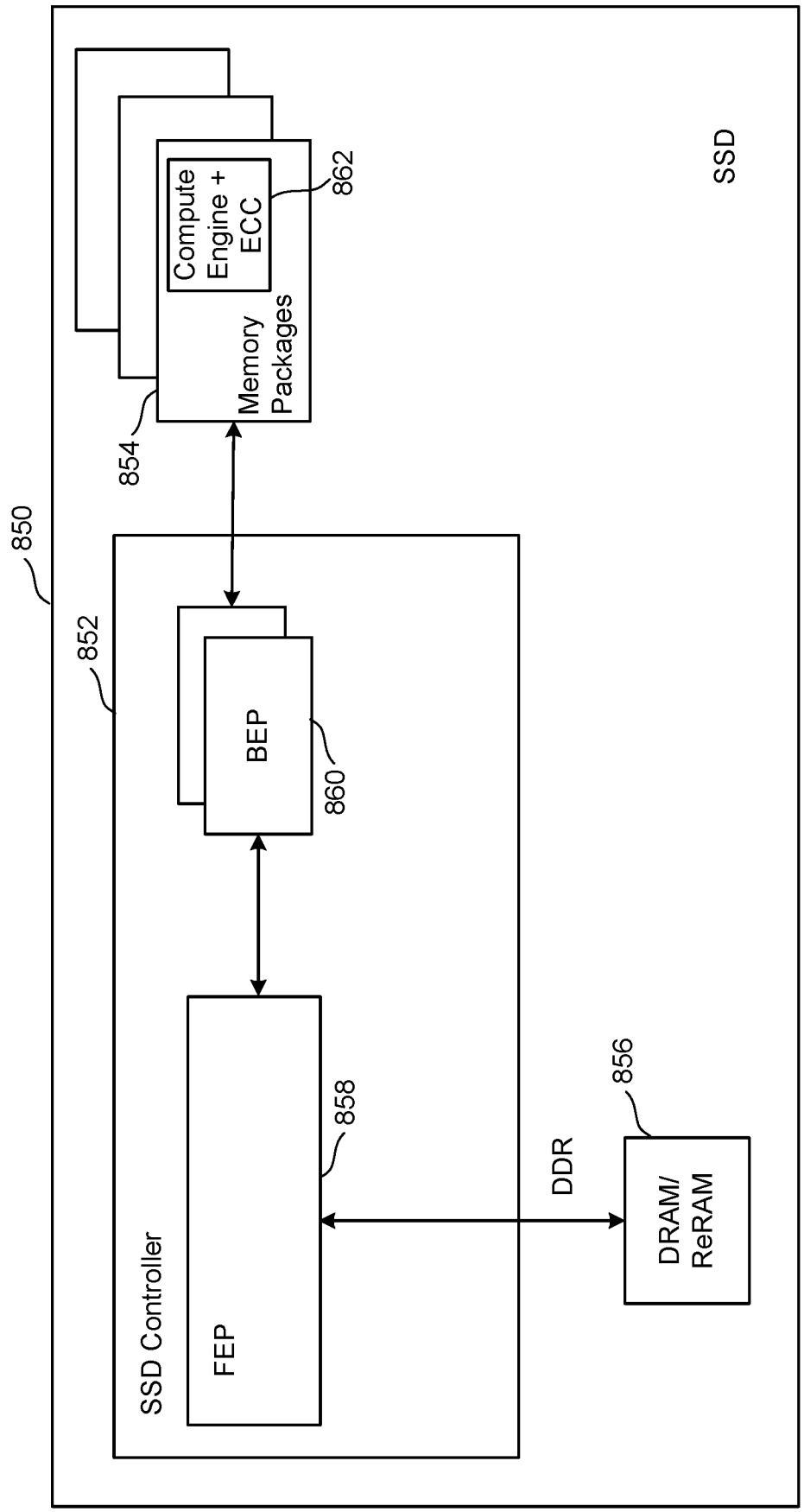
FIG. 13 is a block diagram of one embodiment of a solid state drive that comprises a Controller, non-volatile memory for storing data and a compute engine near the location of the data that can be used to perform common data manipulation operations.

FIG. 13 is a block diagram of one embodiment of a solid state drive 850 that includes memory package level integration, comprising a controller 852, non-volatile memory packages 854 for storing data, DRAM/ReRAM 856 and a compute engine 862 near the location of the data that can be used to perform common data manipulation operations. Controller 852 includes FEP circuit 858 connected to one or more BEP circuits 860. The one or more BEP circuits 860 connect to the non-volatile memory packages 854. One example of FEP circuit 858 is depicted in FIG. 9. One example of BEP circuit 860 is depicted in FIG. 4. DRAM/ReRAM 856 is an example of a local memory (e.g., local high speed volatile working memory). In the embodiment depicted in FIG. 13, the compute engine is integrated with each memory package. A memory package. which typically includes multiple memory die (e.g., NAND non-volatile memory or other type of non-volatile memory), is now modified to include the compute engine ASIC (also known as a compute engine core) within the memory package. In one embodiment, the memory package should also include an ECC engine (or at least the decoder portion of the ECC engine) to decode code words read from the memory and to correct the data read from the non-volatile memory die before being processed by the compute engine. Thus, compute engine 862 includes an ECC engine. In other embodiments, the compute engine can operate on data that has not been subjected to ECC decoding. The memory package can optionally include high-speed memory like DRAM to support the compute engine with access to temporary working data. As the data management operations are within the memory package, the bandwidth available to the compute engine can be much higher than the toggle mode (TM) bandwidth available outside of the memory package.

Figure 13A:
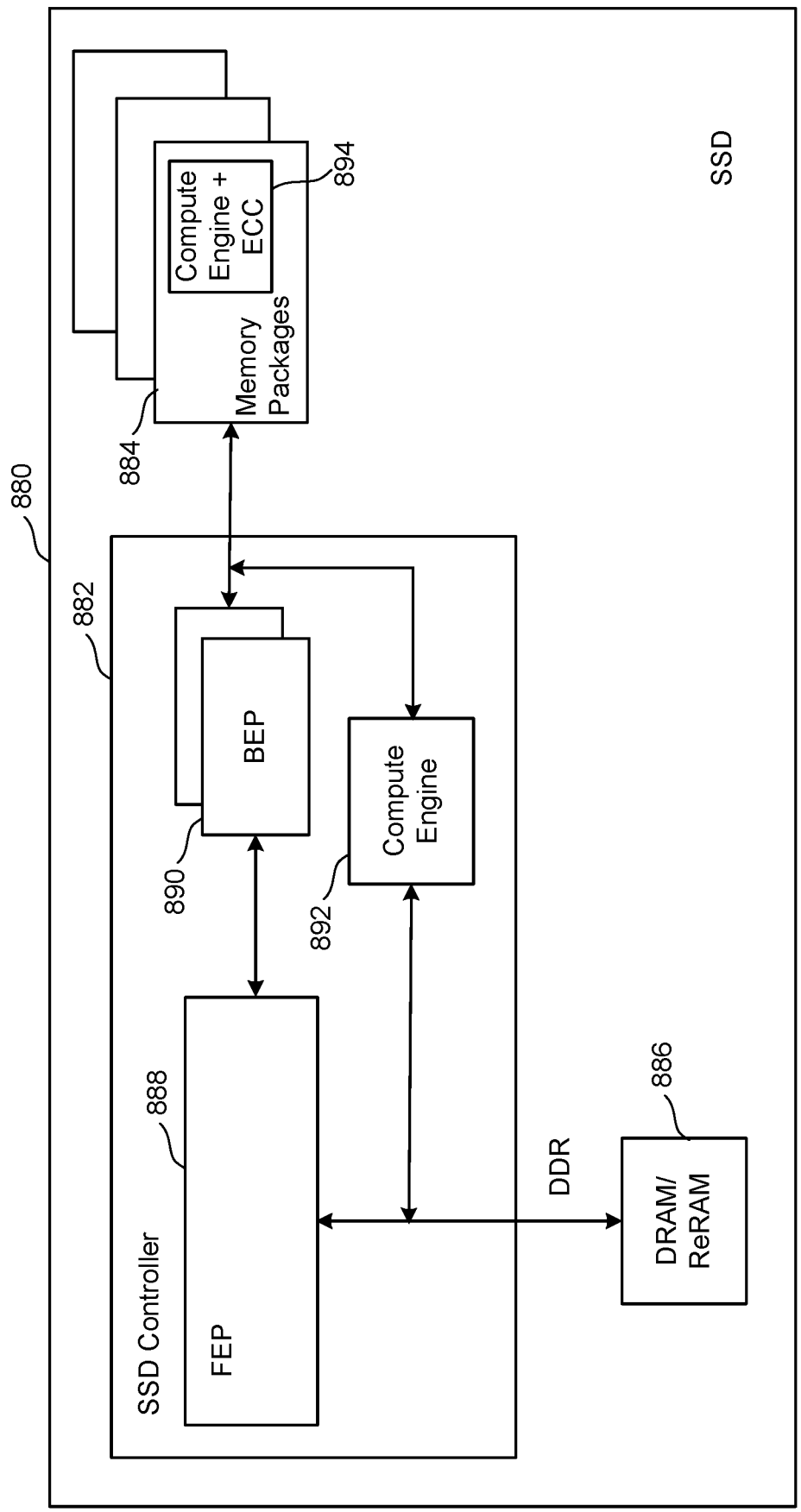
FIG. 13A is a block diagram of one embodiment of a solid state drive that comprises a Controller, non-volatile memory for storing data and a compute engine near the location of the data that can be used to perform common data manipulation operations.

FIG. 13A is a block diagram of one embodiment of a solid state drive 880 that includes controller 882, non-volatile memory packages 884 for storing data, and DRAM/ReRAM 886. Controller 882 includes FEP circuit 888 connected to one or more BEP circuits 890. The one or more BEP circuits 890 connect to the non-volatile memory packages 884. One example of FEP circuit 888 is depicted in FIG. 9. One example of BEP circuit 890 is depicted in FIG. 4. DRAM/ReRAM 886 is an example of a local memory (e.g., local high speed volatile working memory).

The embodiment depicted in FIG. 13A includes multiple (or distributed) compute engines, such that compute engine 892 is positioned in controller 882 and a set of compute engines (with built-in ECC engine) 894 are positioned in non-volatile memory packages 884. For example, compute engine 892 is a standalone ASIC that is connected directly to the toggle mode (TM) channels from the BEP circuits (the interface between the BEP circuits and the memory packages/die). Compute engine 892 can also be connected to the high speed, high-bandwidth DRAM memory 886 through a standard DDR interface to the DRAM/ReRAM chip and to FEP circuit 888. Compute engine 894 is integrated with each memory package. In one embodiment, the memory package also includes an ECC engine (or at least the decoder portion of the ECC engine) to decode code words read from the memory and to correct the data read from the non-volatile memory die before being processed by the compute engine. Thus, compute engine 894 includes an ECC engine. In other embodiments, the compute engine can operate on data that has not been subjected to ECC decoding. The memory package can optionally include high-speed memory like DRAM to support the compute engine with access to temporary working data. As some data manipulation operations are within the memory package, the bandwidth available to the compute engine can be much higher than the toggle mode (TM) bandwidth available outside of the memory package. In some embodiments, the compute engines 892 and 894 will split up the work performed on the data. For example, code from the hosts can program the system to perform some operations on compute engine 892 and other operations on compute engine 894. For instance, the compute engine 894 could perform error correction coding (ECC) function along with simple application level tests, and the compute engine 892 could be executing a flash translation layer (FTL) optimized for sequential or indexed-sequential workloads, along with more complex filtering, sorting and grouping functions at the application query level.

Figure 14:
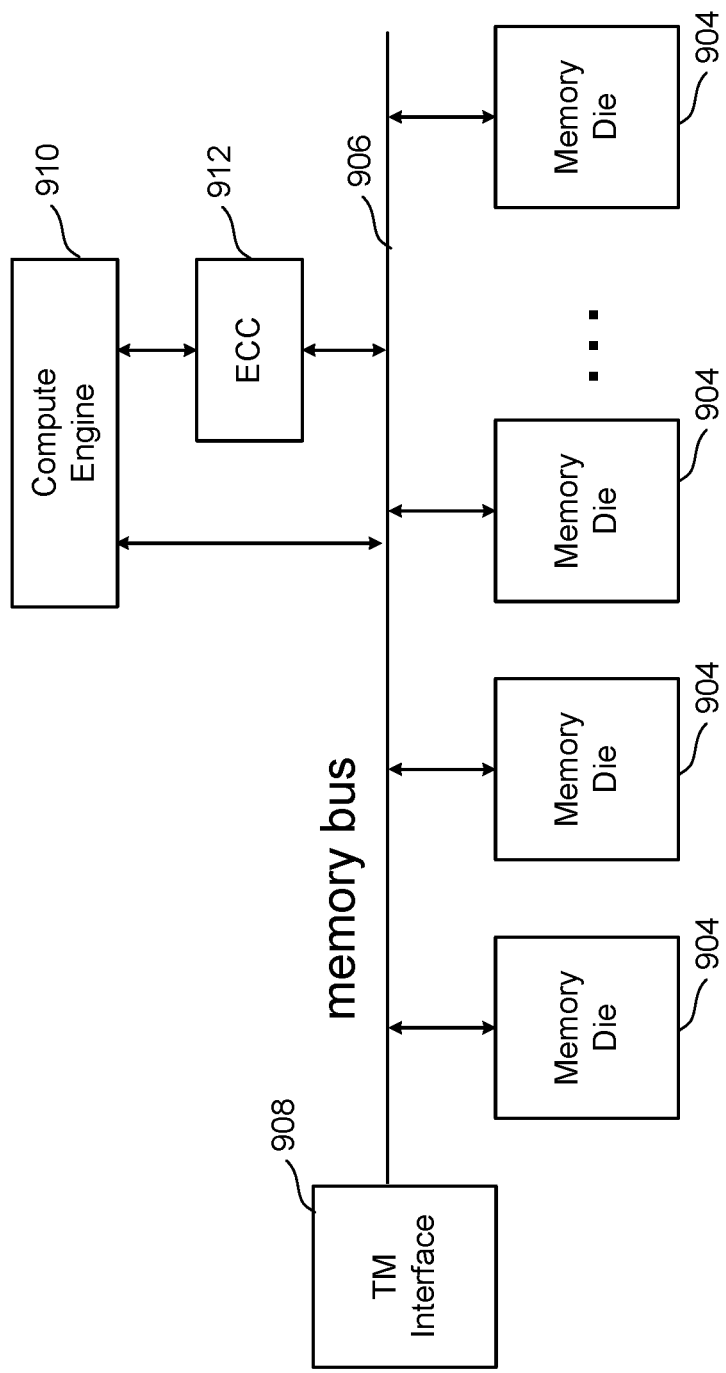
FIG. 14 is a block diagram of one embodiment of a memory package with a compute engine.

FIG. 14 is a block diagram of one embodiment of a memory package that includes a compute engine. The embodiment of 14 can be used to implement one of the memory packages 854 in FIG. 13 or memory packages 884 of FIG. 13A. The memory package of FIG. 14 includes a plurality of memory die 904 connected to a memory bus 906 (analogous to the memory bus of FIG. 5). Memory bus 906 is connected to a TM interface 908 for communicating with an BEP circuit. Additionally, FIG. 14 shows a compute engine 910 connected to the memory bus and to an ECC engine 912. The ECC engine 912 is also connected to memory bus 906. Memory read from a memory die can be subjected to ECC decoding (including fixing errors) and then presented to the compute engine 910 to perform any of the compute operations discussed herein.

Figure 15:
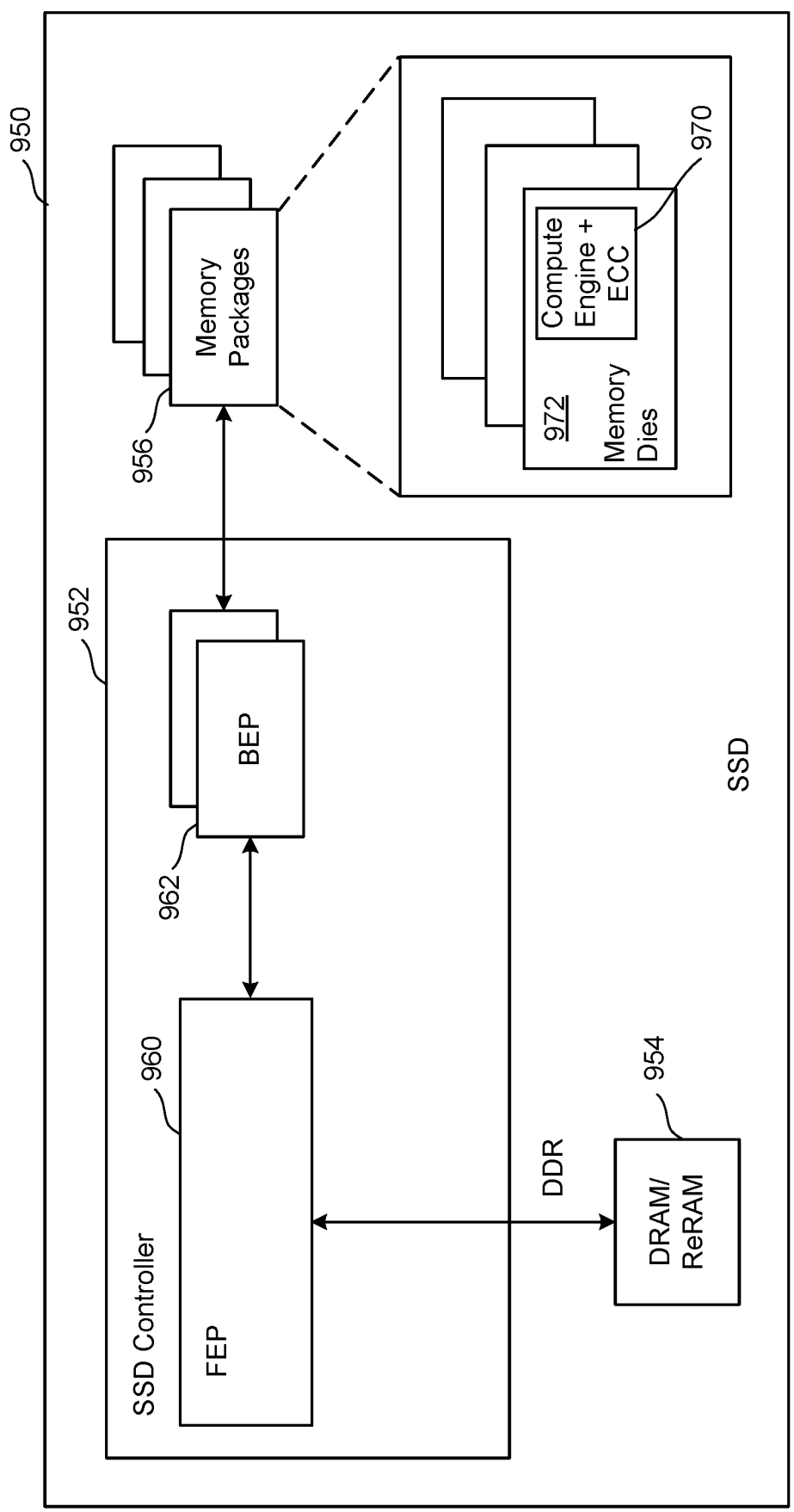
FIG. 15 is a block diagram of one embodiment of a solid state drive that comprises a Controller, non-volatile memory for storing data and a compute engine near the location of the data that can be used to perform common data manipulation operations.

FIG. 15 is a block diagram of one embodiment of a solid state drive 950 that comprises a controller 952, non-volatile memory packages 956 for storing data, DRAM/ReRAM 954, and a compute engine near the location of that data that can be used to perform common data manipulation operations. Controller 952 includes FEP circuit 960 connected to one or more BEP circuits 962. The one or more BEP circuits 962 connect to the non-volatile memory packages 956. One example of FEP circuit 960 is depicted in FIG. 9. One example of BEP circuit 962 is depicted in FIG. 4. DRAM/ReRAM 954 is an example of a local memory (e.g., local high speed volatile working memory).

The embodiment of FIG. 15 implements memory package level integration. For example, each memory package includes multiple memory die and a compute engine 970 integrated within each memory die 972. In one embodiment, the compute engine will include an ECC engine to decode (including correcting) data read from the memory die. The ECC engine can be part of the compute engine or separate from the compute engine but otherwise included in the memory die.

For purposes of this document, the concept of the working memory (or local memory or DRAM discussed above) being connected to the controller includes the working memory being inside the controller. A compute engine that is in communication with the controller can be inside or separate from the controller.

Figure 16:
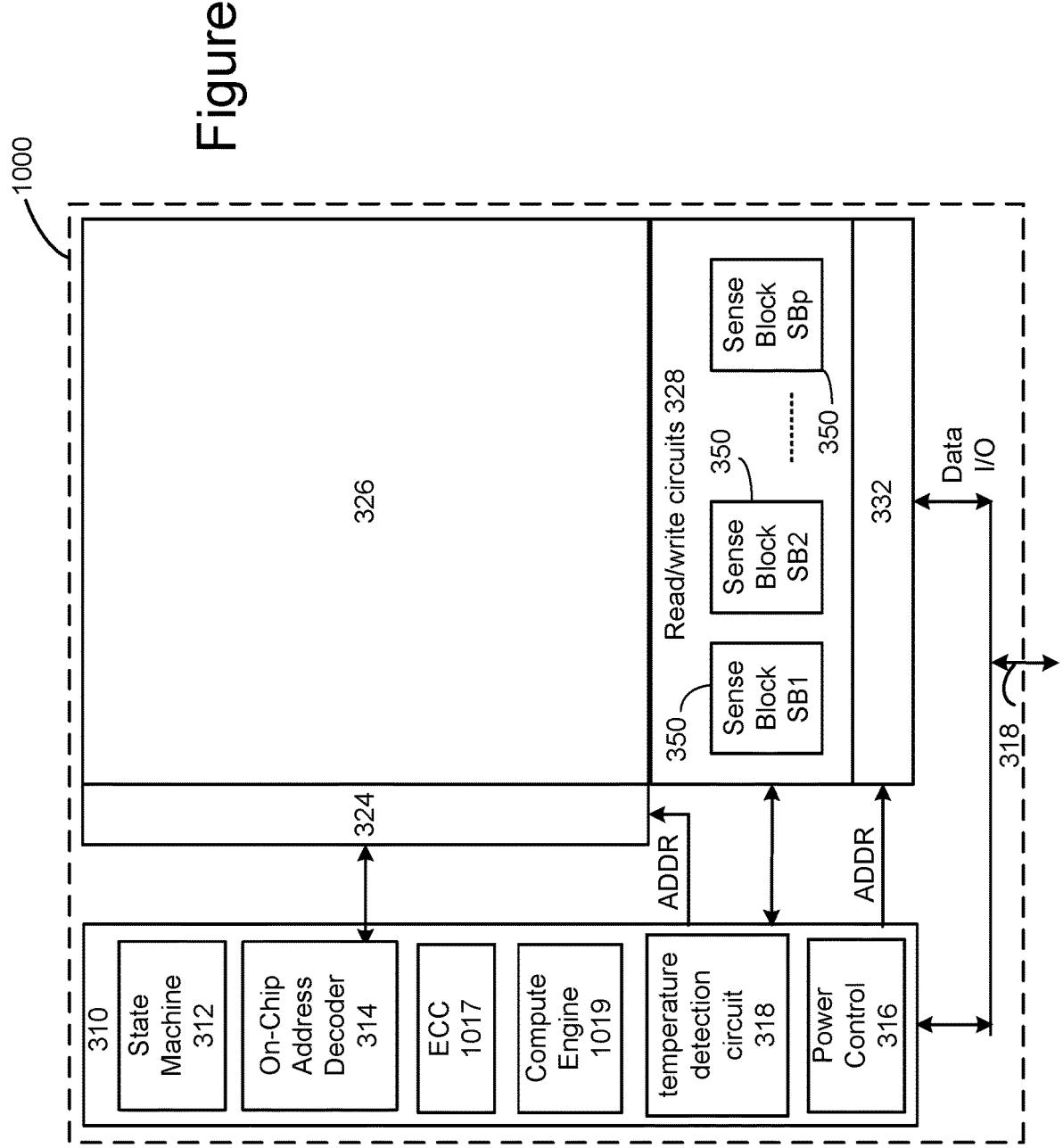
FIG. 16 is a block diagram of one embodiment of a memory die with a compute engine.

FIG. 16 is a block diagram of one embodiment of a memory die 1000 that includes a compute engine. For example, the memory die 1000 is an example implementation of memory die 972 of FIG. 15. The embodiment of FIG. 16 includes the elements of the embodiment of FIG. 6. For example, memory die 1000 includes a three dimensional memory structure 326 of memory cells (such as, for example, a 3D array of memory cells), control circuitry 310, read/write circuits 328, row decoder 324 and column decoder 332. Control circuitry 310 includes state machine 312, on-chip address decoder 314, a power control module 316 and a temperature detection circuit 318. Additionally, in the embodiment of FIG. 16, control circuitry 310 further includes ECC engine 1017 and compute engine 1019. Data read from the memory structure 326 is decoded using ECC engine 1017 and provided to compute engine 1019 for performing various compute operations, as discussed herein.

While the embodiments discussed above show the SSD controller to be implemented as a two ASIC solution containing a BEP ASIC and a FEP ASIC, it is also possible that the SSD controller is implemented with more or less than two ASICs. In that case, the design space can be expanded to place the compute engine within any one or more of the ASICs. Additionally, the compute engine can be placed outside of the ASICs. In other embodiments, the SSD controller can include different architectures, other than the FEP/BEP architecture. Even in the other architectures, the SSD controller can still be configured to include a compute engine inside one of the ASICs or circuits or modules. Additionally, a compute engine can be added to SSDs that are not implemented using ASICs, but implemented using other hardware.

Figure 17:
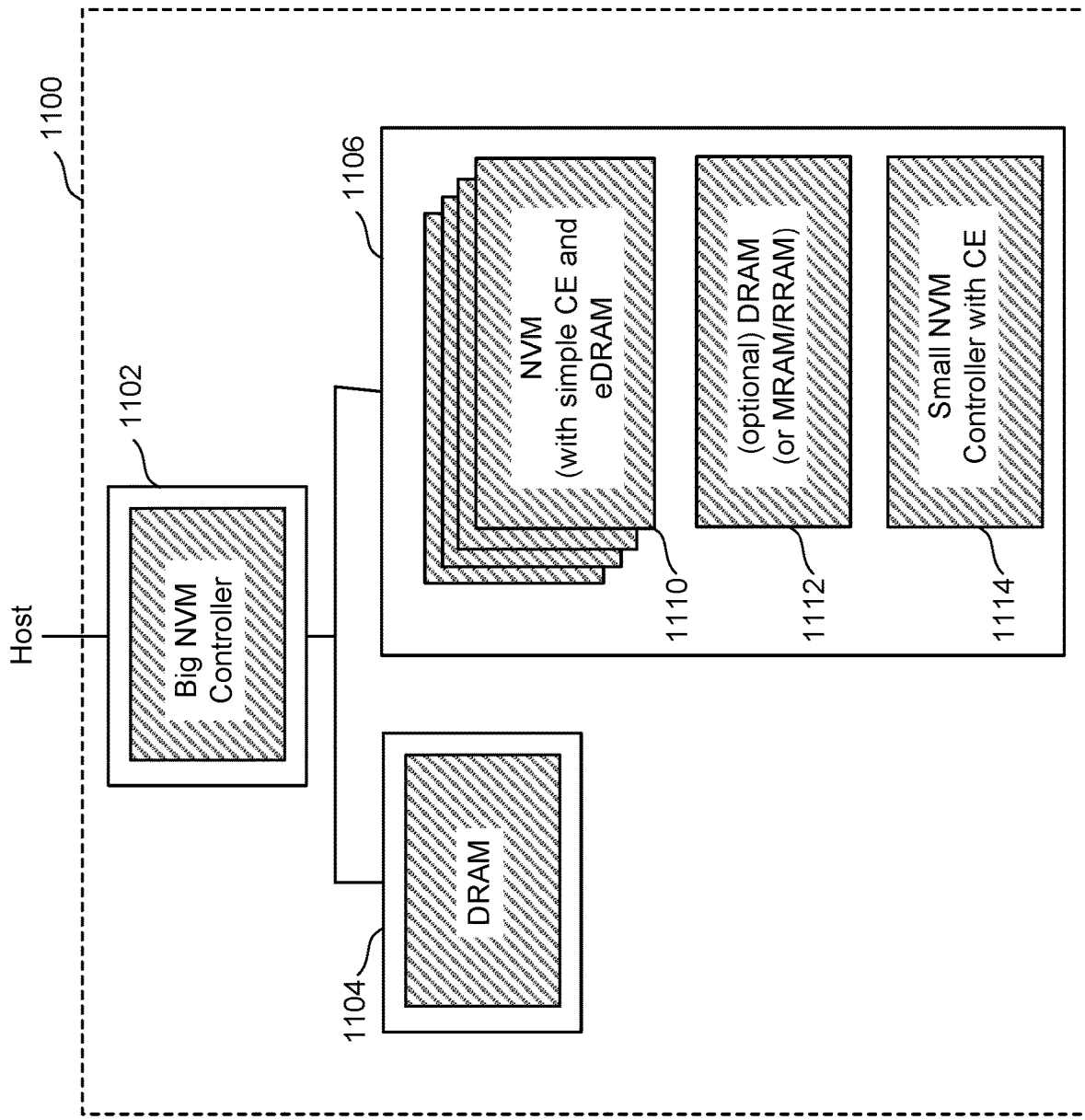
FIG. 17 is a block diagram of one embodiment of a solid state drive that comprises a Controller, non-volatile memory for storing data and a compute engine near the location of the data that can be used to perform common data manipulation operations.

The embodiment of FIG. 15 includes integrating the compute engine within the memory die (such as a NAND memory die or ReRAM memory die). FIG. 17 is a block diagram providing additional details for implementing an embodiment of the system of FIG. 15. Specifically, FIG. 17 shows a host in communication with a SSD 1100 (implemented on a printed circuit board) that includes a Big NVM controller 1102 and a Small NVM controller 1114. The Big NVM controller 1102 is in communication with DRAM 1104 and memory package 1106.

In one embodiment, memory package 1106 includes several memory die 1110, optional DRAM (or MRAM/RRAM/PCM/eDRAM) 1112, and Small NVM Controller 1114. Each of the memory die 1110 has an on die compute engine (CE). In one embodiment the on die compute engine is implemented using CMOS technology on the top surface of a substrate and under the monolithic three-dimensional memory array. Potentially, eDRAM/STT-MRAM/PCM as well as SRAM can be integrated. The on die compute engine (CE) can perform some of the data manipulation operations.

In one embodiment, Small NVM Controller 1114 includes a compute engine (CE) that can perform some of the data manipulation operations. Small NVM Controller 1114 can communicate with the internal memory dies and external chips (i.e. Big NVM controller and DRAM in FIG. 17).

Optional DRAM 1112 is used for the Small NVM Controller 1114 to store working data sets. By off-loading computation from the Big NVM Controller 1102 to Small NVM controller with a compute engine (CE) 1114 and the simple CE of the memory die 1110, the external DRAM requirement and communication overhead can be reduced.

FIG. 17 shows that each of Big NVM Controller 1102, DRAM 1104, memory die 1110, DRAM 1112 and Small NVM Controller 1114 can be implemented on separate silicon die in three different packages mounted on one printed circuit board. Thus, FIG. 17 provides a big and small NVM controller architecture. The Big NVM Controller 1102 interfaces with the host and DRAM. The Small NVM Controller 1114 can be inside any of the memory packages. The Small NVM Controller 1114 includes a computational engine with optional DRAM and manages multiple NVM channels. A mapping table can be stored in the optional DRAM (or MRAM/PRAM).

Figure 18:
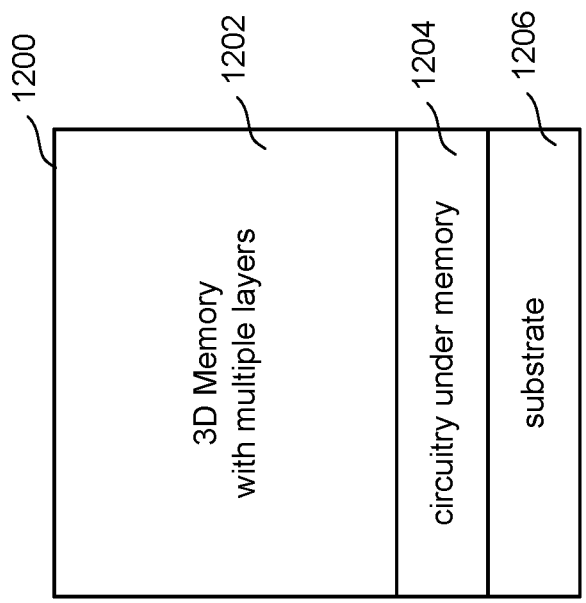
FIG. 18 is a block diagram of one embodiment of a memory die with circuitry under the memory array.

FIG. 18 is a block diagram of one embodiment of a memory die 1200 with circuitry under the memory array. FIG. 18 shows a monolithic three-dimensional memory structure 1202 with multiple layers. Underneath the memory structure 1202 is circuitry 1204 that is implemented on the top surface of the substrate 1206 and under the memory array 1202. In one embodiment, the circuitry 1204 is implemented using CMOS technology. For example, simple computational logic can be integrated in the CMOS logic under the memory array 1202 potentially with eDRAM/STT-MRAM/PCM as well as SRAM/latches. Simple circuitry logic (i.e., randomizer, ID generator, PUF, or AES) and simple error management logic (i.e., error location map or a simple error avoiding algorithm such as read reference optimizer) as well as ECC can be integrated in the CMOS logic under the memory array 1202 as examples of the compute engine discussed above. This improves latency and performance by eliminating data transfer overhead from the memory die to the separate controller die. An FPGA could be integrated, supporting multiple configurations with a single system on a chip as an aforementioned compute engine. An FPGA can be integrated, supporting multiple configurations within a system on a chip.

Figure 19:
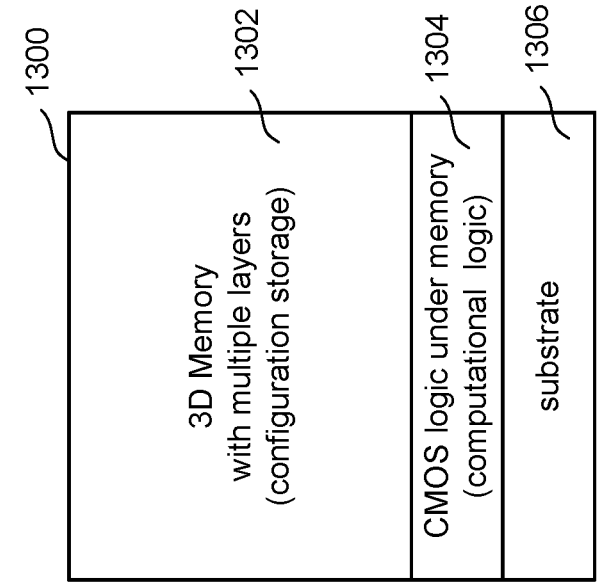
FIG. 19 is a block diagram of one embodiment of a memory die with circuitry under the memory array.

Additionally, other functions can be integrated as an aforementioned compute engine. For example, a CPU or parallel computational engine can be integrated as an aforementioned compute engine. An SIMD engine ("GPU"), neural network, DSP engine (e.g., image/audio processing), digital logic operation (multiplication, addition, subtraction, XOR, etc.), data mining (apriori, k-means, pagerank, decision tree) or pattern matching (i.e., Hamming distance calculation), FPGA fabric supporting multiple configurations in the memory die, high speed I/O circuits with memory equalizers, circuits for optical or capacitor/inductive coupling based on interconnections can also be used. In one embodiment, the compute engine needs to be able to work with encrypted data when AES is bypassed for specific applications. In some embodiments, the compute engine may need to work with erroneous data when ECC is bypassed for specific applications FIG. 19 is a block diagram of one embodiment of a memory die 1300 with circuitry 1304 under the memory array 1302 for using the non-volatile memory die 1300 as a non-volatile-FPGA. The memory die 1300 will include a three-dimensional monolithic memory array 1302. Implemented on the top surface of the substrate 1306, and under the memory array 1302, will be CMOS logic 1304 that implements a FPGA to be used as a compute engine (per the discussion above). This system will use the memory array 1302 (NAND or other type of non-volatile memory) as configuration storage for the reconfigurable logic 1304 of the FPGA. That is, configuration data stored in memory array 1302 is used to configure the FPGA's. This will make the FPGA non-volatile. This will allow for fast boot up compared to conventional FPGAs, which require a reading of configuration data from a discrete nonvolatile memory device to the volatile FPGA cell array. When the FPGA (hardware accelerator/compute engine) is not needed, the configuration storage (the memory array) can be used as just normal non-volatile storage, saving idle power.

In many systems, the complete set of L2P tables are stored in the non-volatile memory (e.g., the Memory Packages), with a subset being cached within local working memory (e.g., see DRAM [or ReRam or SRAM] of FIGS. 1, 2, 7, 8, 10, 12, 13, 13A, 15, and 17, or another buffer for the Controller). When there is a cache miss because the needed L2P table (or portion of table) is not within the cache of the local working memory, then the needed L2P table (or portion of table) is retrieved from the non-volatile memory and loaded into the cache of the local working memory. The L2P tables consume a significant amount of space in the local working memory.

In certain embodiments, the compute engine discussed above with respect to FIGS. 1-19 will also use the local working memory to stored data while performing its computational operations as described above. The use of the local working memory by the compute engine may reduce the space available for the cache storing the L2P tables, thereby, causing a greater "miss" rate for the cache and degrading performance. Limiting the amount of local working memory available to the compute engine will reduce the performance of the compute engine To alleviate the performance issues related to too much demand on the local working memory, it is proposed to reduce the amount of space needed to store L2P tables in the working memory without significantly increasing the "miss" rate by maintaining coarse logical address to physical address tables in the working memory for use with sequentially accessed data and maintaining fine logical address to physical address tables in the working memory for use with randomly accessed data. Certain embodiments disclosed herein take advantage of special access patterns of database applications (or other applications) to use a lower granularity of L2P tables (e.g., erase block level entry L2P tables) for data with known sequential access patterns. Other intermediate levels of granularity such as sub-erase block or word line can also be used with these known sequential access patterns. Page level entries are continued to be used for data with known random access patterns.

Figure 20:
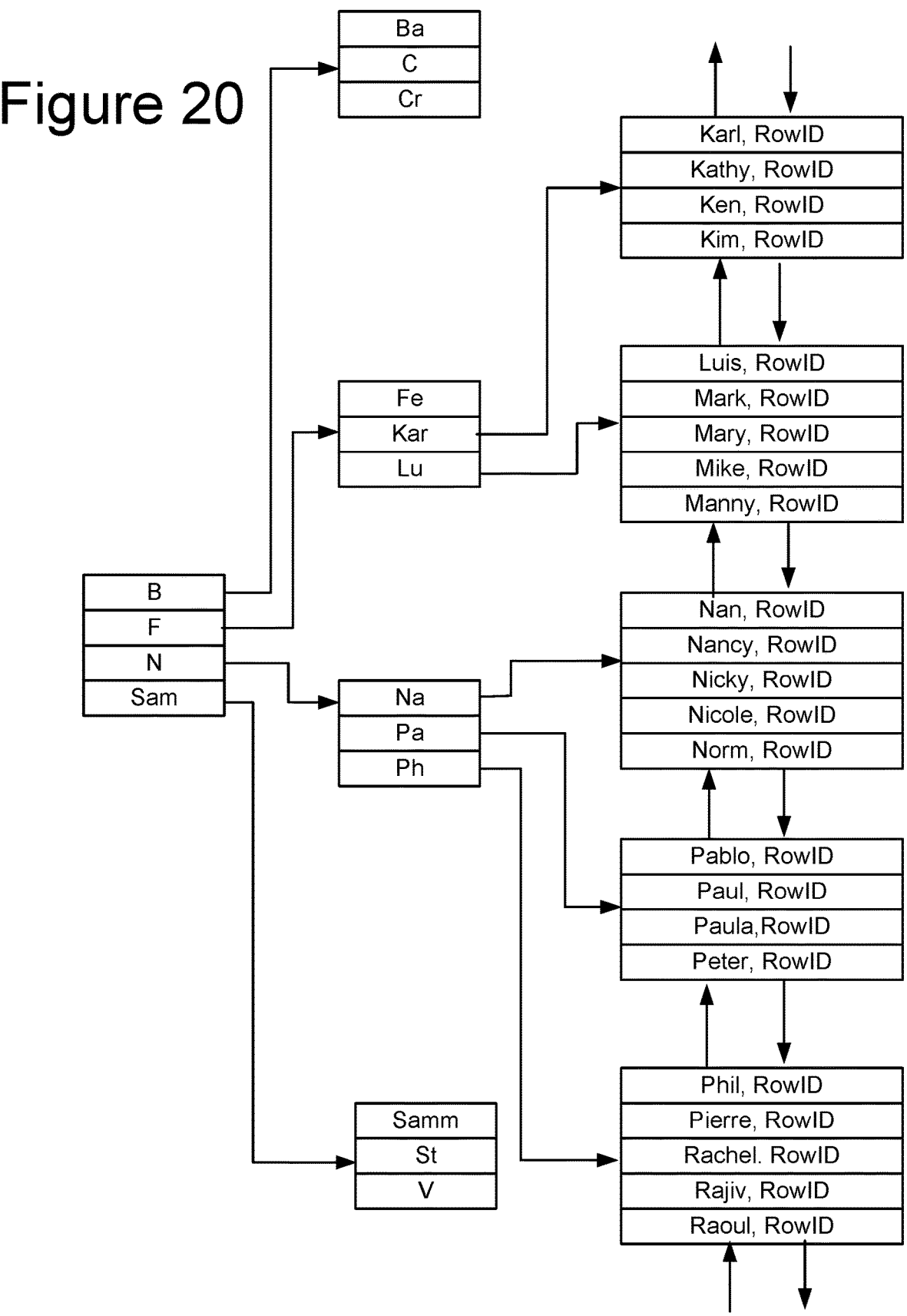
FIG. 20 depicts a portion of a database.

FIG. 20 depicts a portion of an example database and illustrates an example of randomly accessed data and sequentially accessed data. FIG. 20 shows two levels of branch nodes and one level of leaf nodes. The branch nodes act as indexes to lower level nodes. The leaf nodes can include many data entries (e.g., in this case names). The first level of branch nodes includes nodes B, F, H and Sam. Node B points to nodes Ba, C and Cr of the second level of branch nodes. Node F points to nodes Fe, Kar and Lu of the second level of branch nodes. Node N points to nodes Na, Pa and Ph of the second level of branch nodes. Node Sam points to nodes Samm, St and V of the second level of branch nodes. Branch node Kar points to leaf nodes Krl, Kathy, Ken and Kim. Branch node Lu points to leaf nodes Luis, Mark, Mary, Mike and Manny. Branch node Na points to leaf nodes Nan, Nancy, Nicky, Nicole and Norm. Branch node Pa points to leaf nodes Pablo, Paul, Paula and Peter. Branch node Ph points to leaf nodes Phil, Pierre, Rachel, Rajiv and Raoul.

In the example of FIG. 20, the branch nodes are accesses randomly and, therefore, are determined to be randomly accessed data (for a random workload). The leaf nodes are stored in consecutive addresses (i.e. in alphabetical order) in the non-volatile memory as sequentially accessed data; therefore, they can be written into the non-volatile memory together as such data is serialized using a write buffer between the host and the non-volatile memory for higher performance.

Log-structured file systems optimized for the non-volatile memory can support aggregation of multiple random write operations into a single sequential write operation. Then, it typically requires sequential reading of the selected leaf blocks for finding a specific node (e.g., finding a specific last name) when it needs to be searched. HDFS (Hadoop File System) and analytics databases are additional examples that require sequential access to the non-volatile memory. Thus, the SSD (or other device) workload for the database application can be divided into random and sequential workloads.

For example, the non-volatile memory can be divided into (at least) two sections. A first section (or portion) of memory (e.g., a first set of memory cells) is configured to store sequentially accessed data (e.g., leaf nodes). A second section (or portion) of memory (e.g., a second set of memory cells) is configured to store randomly accessed data (e.g., meta data, pointers, branch bodes, etc.). The first section/portion is physically separate from the second section/portion. In one example implementation, a first set of memory die for a package or system comprise the first section and a second set of memory die for the package or system comprise the second section. The different sections can also be on the same memory die. L2P tables for data stored in the second section (i.e., store randomly accessed data) will include entries for each page of data and are referred to fine L2P tables (or fine logical address to physical address tables). L2P tables for data stored in the first section (i.e., sequentially accessed data) will include entries at the block level and are referred to a coarse L2P tables (or coarse logical address to physical address tables). In one example of a coarse L2P table, there is one L2P entry per block, where the block is the unit of erase. In one example, each L2P entry includes a logical address used by the host and a physical address in the non-volatile memory. In other embodiments, coarse L2P tables for data stored in the second section (i.e., sequential data) will include entries at the word line level or other sub-block level.

Figure 21:
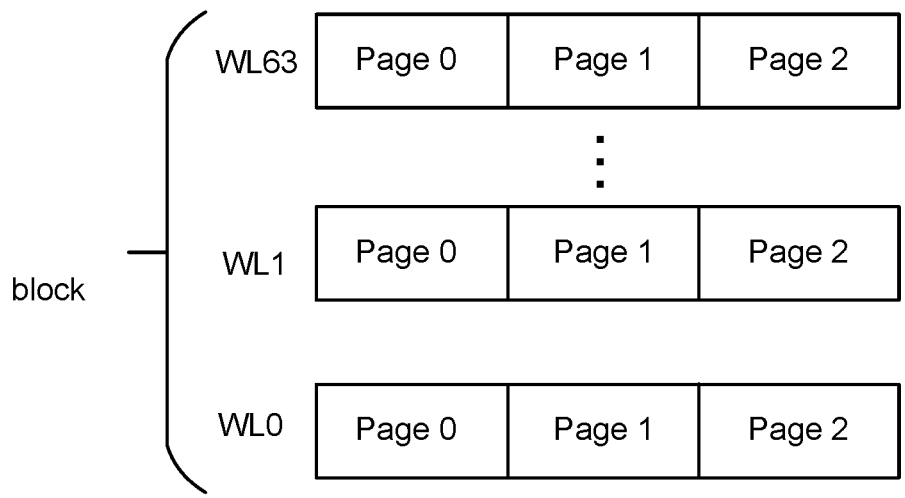
FIG. 21 is a block diagram of a block of non-volatile memory.

Because the L2P tables for data stored in the first section (i.e., sequentially accessed data) will include entries at the block level, there will be many less L2P entries. For example, FIG. 21 is a block diagram of an example block of non-volatile memory that includes sixty four word lines (WL0-WL63), with each word line having three pages (Page 0, Page 1 and Page 2). Thus, the example block of FIG. 21 includes 192 pages. Other blocks can have more or less than sixty four word lines and more or less than three pages per word line. If the example block of FIG. 21 is used to store random data than the corresponding L2P table would include 192 L2P entries. However, if the example block of FIG. 21 is used to store sequential data than the corresponding L2P table would include 1 L2P entry, which saves 191 L2P entries' worth of space. As a typical system can have thousands or millions of blocks, the savings for only storing 1 L2P entry per block (that is, the savings for using coarse L2P tables instead of fine L2P tables) is very significant. The reduction in memory space needed by coarse L2P tables opens up room in the local working memory for the local compute engine, without increasing the "miss" rate for the cache of L2P tables in the local working memory. Because the local compute engine will have more local (volatile) working memory (e.g., DRAM) to work with, computational performance will increase.

Figure 22:
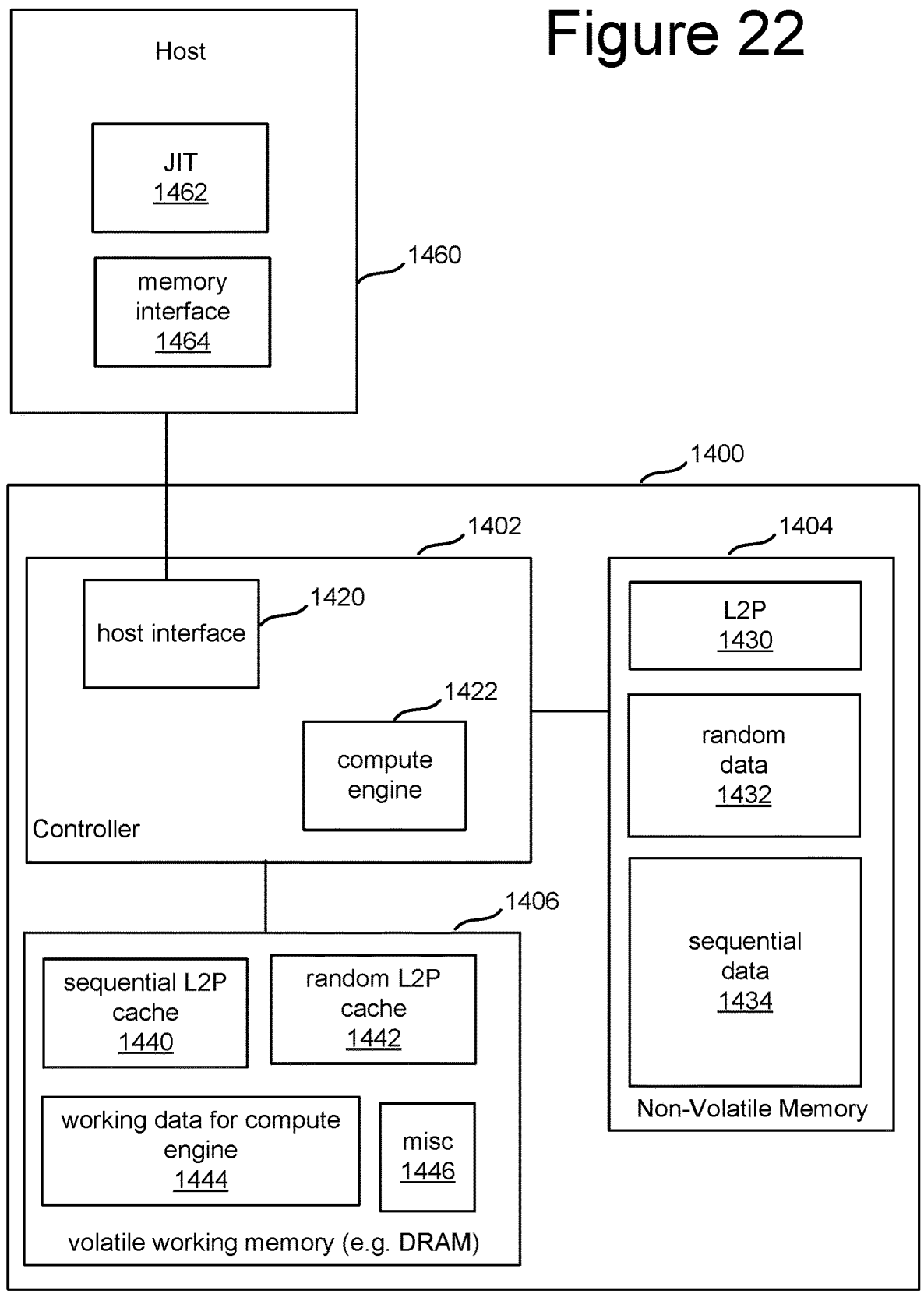
FIG. 22 is a block diagram illustrating an implementation of a solid state drive (or other memory system) that comprises a Controller, non-volatile memory for storing data and a compute engine near the location of the data that can be used to perform common data manipulation operations, in accordance with some embodiments. The system of FIG. 22 reduces the size in memory of logical address to physical address tables by having separate tables for random and sequential workload to thereby provide more memory resources to the compute engine.

FIG. 22 is a block diagram of a block of non-volatile memory system (e.g., a SSD or other device) that reduces the amount of space needed to store L2P tables in the working memory without significantly increasing the "miss" rate by maintaining coarse L2P tables in the working memory for use with sequentially accessed data and maintaining fine L2P tables in the working memory for use with randomly accessed data. The block diagram of FIG. 22, while most similar to FIG. 1, can be used to generalize and applies to any of the embodiments of FIGS. 1-2, 7-8, 10, 12, 13, 13A, 15, and 17-19. That is, the discussion herein about the technology for reducing the amount of space needed to store L2P tables in the working memory by maintaining coarse L2P tables and fine L2P tables applies to and can be implemented by all of the embodiments of FIGS. 1-2, 7-8, 10, 12, 13, 13A, 15, and 17-19.

FIG. 22 depicts SSD (or other device) 1400 that includes controller 1402, non-volatile memory 1404 (e.g., Memory Packages) and volatile working memory (e.g., DRAM) 1406. Controller 1402 includes, among other things, a host interface 1420 and a local compute engine 1422 (see more complete discussion above of the compute engine). In other embodiments that incorporate the proposed technology for reducing the amount of space needed to store L2P tables in the working memory, as described above, the compute engine can be outside of the controller, including in a memory package (see e.g., the embodiments of FIGS. 13, 13A, 15 and 17-19) and/or in a memory die (see e.g., the embodiments of FIGS. 15 and 17-19).

Non-volatile memory 1404 include an area 1430 for storing a complete set of L2P tables, section/portion 1432 configured to store randomly accessed data and a section/portion 1434 configured to store sequentially accessed data. Section 1432 is physically separate from the second section 1434. In other embodiments, the randomly accessed data and sequentially accessed data can be stored in a common section. In some embodiments, the coarse L2P tables (for sequentially accessed data) are stored in a same area as the fine L2P tables (for randomly accessed data). In other embodiments, the coarse L2P tables (for sequentially accessed data) are stored separately from the fine L2P tables (for randomly accessed data). In one example, the fine L2P tables (for randomly accessed data) are stored in the section 1432 and the coarse L2P tables (for sequentially accessed data) are stored in the section 1434.

In one embodiment, volatile working memory 1406 includes sequential L2P cache 1440, random L2P cache 1442, working data for compute engine 1444 and miscellaneous region 1446. Sequential L2P cache 1440 is a cache that stores a subset of the coarse L2P tables. Random L2P cache 1442 is a cache that stores a subset of the fine L2P tables. Working data for compute engine 1444 is memory space used by the local compute engine to perform data computations, as discussed above. Miscellaneous region 1446 is used by controller 1402 for other purposes. Because the coarse L2P tables stored in Sequential L2P cache 1440 are much smaller than the fine L2P tables, there is more room in volatile working memory 1406 for a bigger working data for compute engine 1444, which results in higher performance for the local compute engine 1422.

In one example implementation, compute engine 1422 is configured to use the coarse logical address to physical address tables of the sequential L2P cache 1440 to perform address translation between logical and physical addresses for the leaf nodes for one or more database data structures stored in the portion 1434 of non-volatile memory 1404 and compute engine 1422 is configured to use the fine logical address to physical address tables of random L2P cache 1442 to perform address translation between logical and physical addresses for the branch nodes for one or more database data structures stored in portion 1432 of non-volatile memory 1404.

As discussed above, the memory system treats sequentially accessed data different than randomly accessed data. In one embodiment, the memory system (based on the operations being performed with the data) determines whether the data is sequentially accessed data or randomly accessed data. In another embodiment, the host determines whether the data is sequentially accessed data or randomly accessed data. FIG. 22 depicts a host 1460, in communication with memory system 1400 (via host interface 1420 of controller 1402), that determines whether the data is sequentially accessed data or randomly accessed data. Host 1460 includes a Just-In-Time Compiler 1462 and a memory interface 1464. Host 1460 determines whether target data being accessed by a set of one or more database operations is randomly accessed data or sequentially accessed data. Just-In-Time Compiler 1462 compiles code to perform the set of one or more database operations on a local compute engine 1422 located inside memory system 1400 and embeds in the compiled code an indication of whether the target data is randomly accessed data or sequentially accessed data. Memory interface 1464 is used to communicate with host interface 1420 of memory system 1400, including transmitting the compiled code with the embedded indication to controller 1402 and/or compute engine 1422 (via host interface 1420). The target data can be accessed by the compute engine performing the address translation or the compute engine requesting (or working with) the controller to perform the address translation. Thus, the compute engine can perform memory reads (or writes) or the compute engine can work with the controller to perform a memory read (or write).

Figure 23:
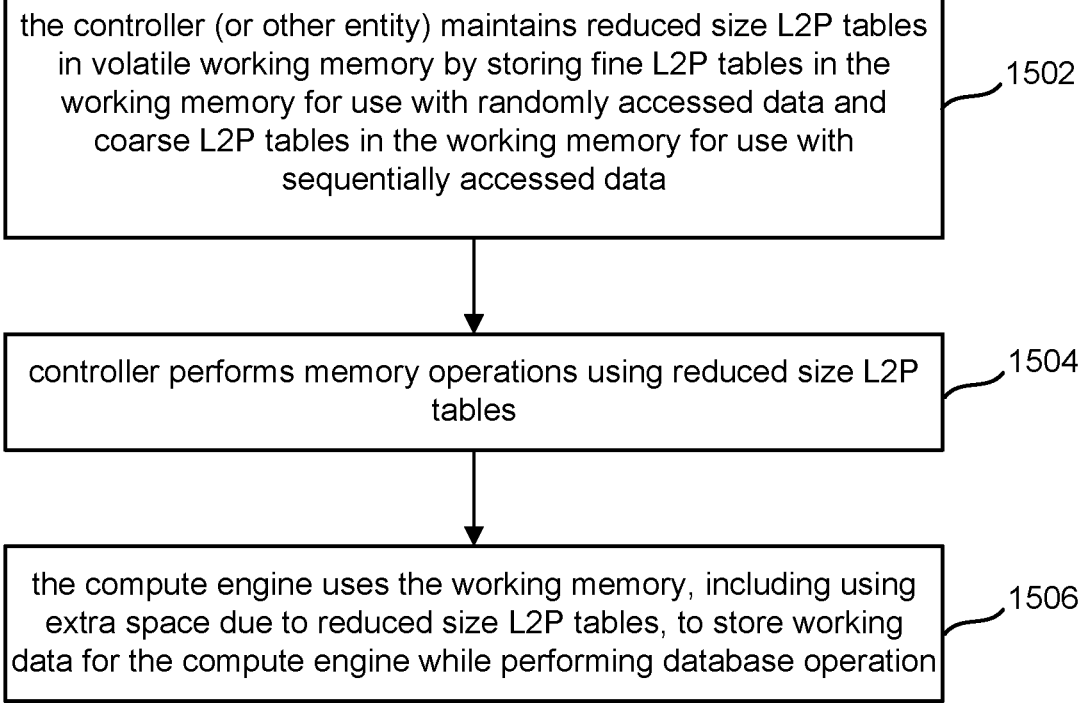
FIG. 23 is a flow chart describing one embodiment of a process for reducing the size in memory of logical address to physical address tables by having separate tables for random and sequential workload to thereby provide more memory resources to the compute engine inside the memory system (e.g. behind the host interface).

FIG. 23 is a flow chart describing one embodiment of a process for reducing the size in memory of L2P tables by having separate tables for random and sequential workload to thereby provide more memory resources to a local compute engine. In one embodiment, the process of FIG. 23 is performed by memory system 1400 of FIG. 22 (representing any of the embodiments of FIGS. 1-2, 7-8, 10, 12, 13, 15, and 17-19). In step 1502, the controller (or other entity) maintains reduced size L2P tables in volatile working memory by storing fine L2P tables in the working memory for use with randomly accessed data and coarse L2P tables in the working memory for use with sequentially accessed data. In step 1504, the controller performs memory operations using the reduced size L2P tables. For example, memory operations (e.g., program, erase, read) for sequentially accessed data are performed using coarse L2P tables and memory operations for randomly accessed data are performed using fine L2P tables. In step 1506, the compute engine (inside the controller or outside the controller, or same die as controller or different die than controller) uses the volatile working memory, including extra space due to reduced size L2P tables, to store working data while performing one or more database operations. Steps 1502-1506 can be performed sequentially or concurrently.

Figure 24:
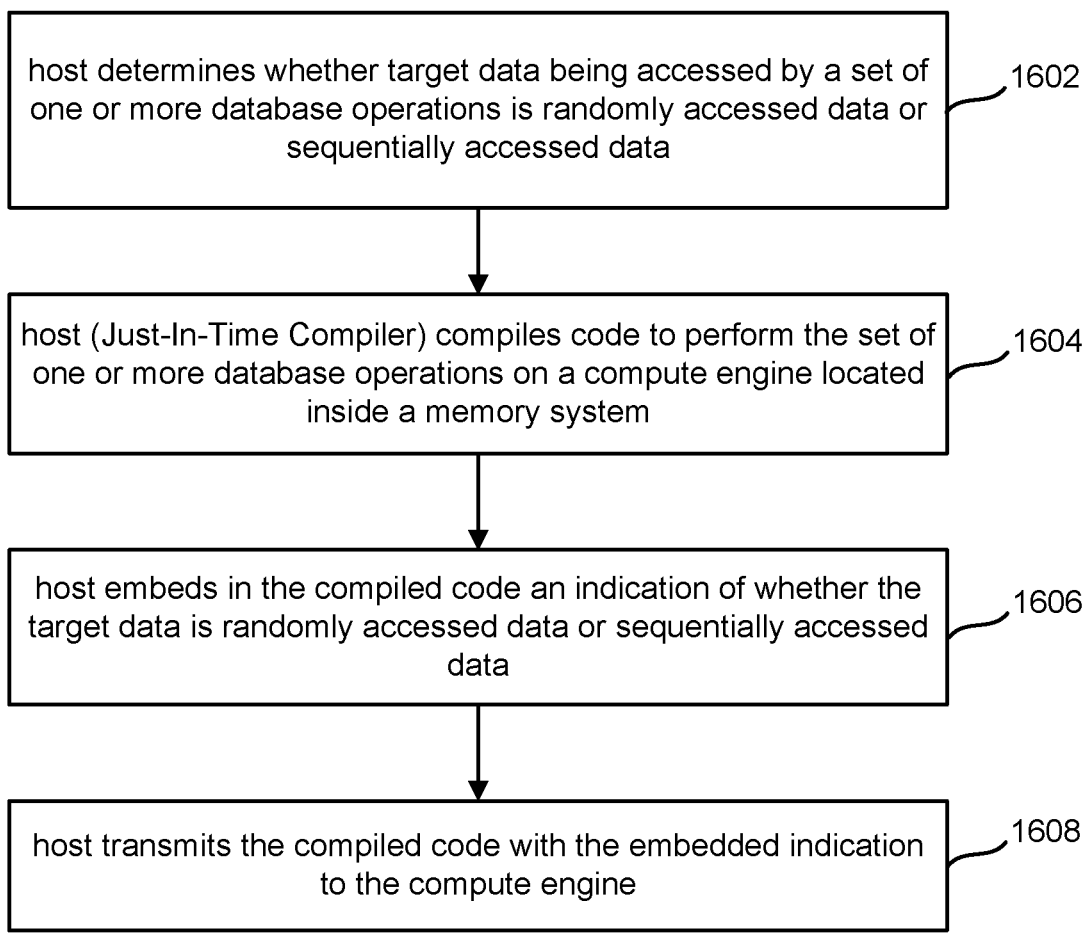
FIG. 24 is a flow chart describing one embodiment of a process performed by a host.

FIG. 24 is a flow chart describing one embodiment of a process performed by a host when operating a memory system (e.g., such as the memory systems of FIGS. 1-2, 7-8, 10, 12, 13, 15, 17-19 and 22) performing the process of FIG. 23. In step 1602, the host determines whether target data being accessed by a set of one or more database operations is randomly accessed data or sequentially accessed data. In step 1604, the host (e.g., Just-In-Time Compiler 1462) compiles code to perform the set of one or more database operations on a compute engine located inside a memory system. The code is compiled for the specific compute engine chosen to perform the task. In step1606, the host (e.g., Just-In-Time Compiler 1462) embeds in the compiled code an indication of whether the target data is randomly accessed data or sequentially accessed data. In step 1608, the host (via memory interface 1464) transmits the compiled code with the embedded indication to the compute engine (e.g. via host interface 1420 of controller 1402 or any of the other controller architectures described above).

Figure 25:
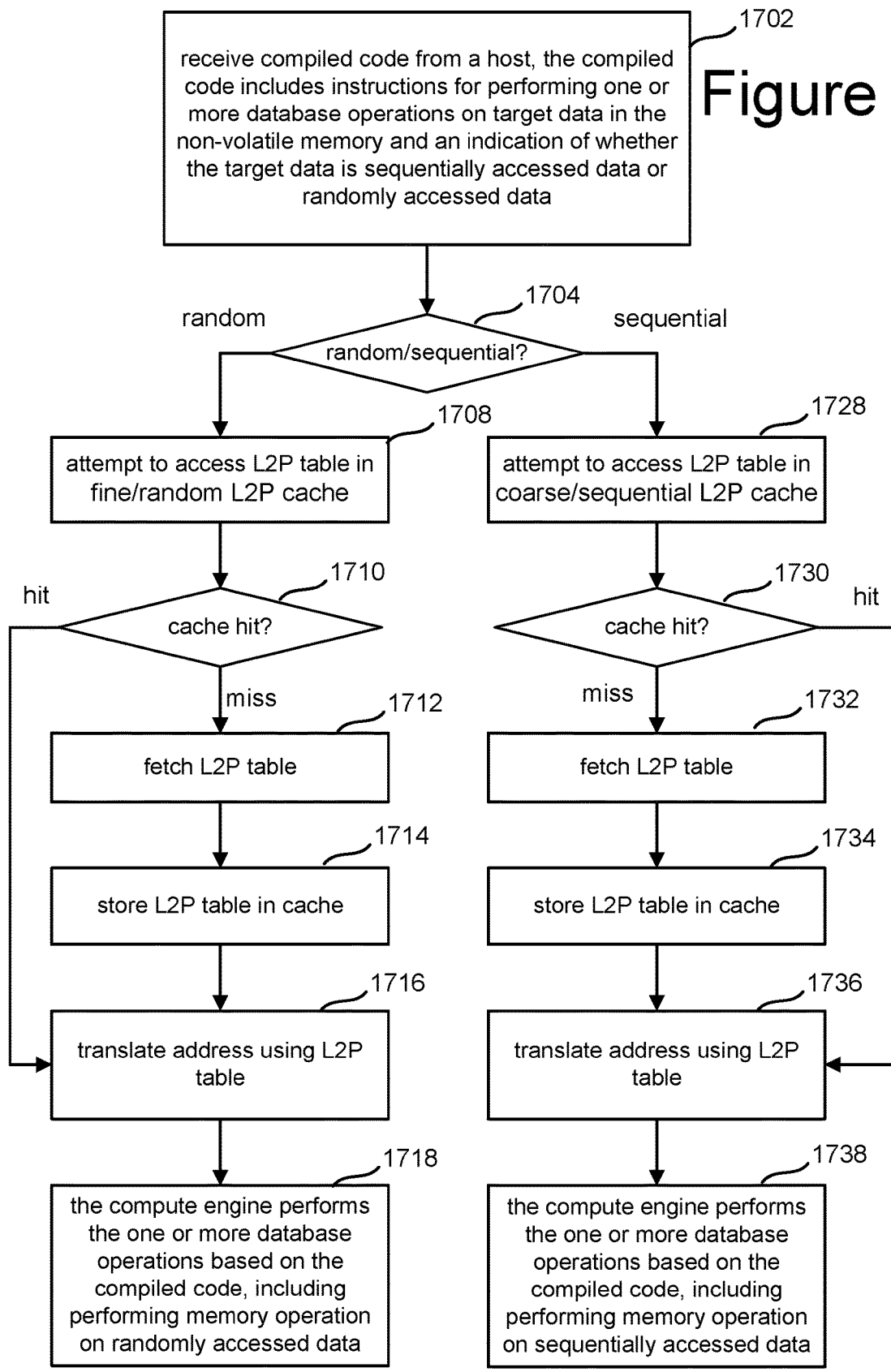
FIG. 25 is a flow chart describing one embodiment of a process for operating a memory system using separate logical address to physical address tables for random and sequential workload.

FIG. 25 is a flow chart describing one embodiment of a process for operating a memory using separate logical address to physical address tables for random and sequential workload. In one embodiment, the process of FIG. 25 is performed by the memory system (any of the embodiments of FIGS. 1-2, 7-8, 10, 12, 13, 15, 17-19 and 22) in response to step 1608 of FIG. 24. In one embodiment, the system of FIG. 22 (representing any of the embodiments of FIGS. 1-2, 7-8, 10, 12, 13, 15, and 17-19) will perform the process of FIG. 25 on the database of FIG. 20.

In step 1702 the memory system receives the compiled code (see step 1608) from the host. For example, the compiled code is received at host interface 1420 and forwarded to another portion of the controller and/or to the compute engine. The compiled code includes instructions for performing one or more database operations on target data in the non-volatile memory. The compiled code includes one or more logical addresses for the target data that need to be translated to physical addresses in the non-volatile memory. The compiled code also includes an indication of whether the target data is sequentially accessed data or randomly accessed data. The indication discussed herein can be a flag or variable that has one value for sequentially accesses data and another value for randomly accessed data. Alternatively, the indication can be the logical address used by the host, where a first set of logical addresses are reserved for and indicate sequential data and a second set of logical addresses are reserved for and indicate random data.

In step 1704, the memory system determines whether the target data is sequentially accesses data or randomly accessed data based on reading the indication from the compiled code. This can be performed by the compute engine and/or the controller.

In another embodiment, the memory system classifies the target data as random or sequential and stores randomly accessed data separately from sequentially accessed data. Therefore, based on the data received or addressed the memory system determines whether the job is for random or sequential data. In another embodiment, the memory system can determine whether the job is for randomly accessed data or sequentially accessed data based on the instructions from the host. For example, if the host is requesting sequential reads then the system assumes the job is for sequentially accessed data and if the host is requesting random reads then the system assumes the job is for randomly accessed data. In another embodiment, the memory system can determine whether the job is for randomly accessed data or sequentially accessed data by utilizing a data structure related to the database. In some embodiments, the instructions from the host are instructions for the local compute engine to perform computations on a set of data. If those instructions are accessing data previously classified as sequentially accessed data then the system assumes the job is for sequentially accessed data and if those are accessing data previously classified as randomly accessed data then the system assumes the job is for randomly accessed data. Alternatively, if those instructions require a scan operation then the system assumes the job is for sequentially accessed data and if those instructions require a seek operation then the systems assumes the job is for randomly accessed data. Similarly, if the instructions cause a sequential writing of data then the operation then the system assumes the job is for sequentially accessed data and if the instructions cause a single write then the operation then the system assumes the job is for randomly accessed data.

Looking back at step 1704, if the controller and/or compute engine determines that the job is for randomly accessed data, then in step 1708 the controller and/or compute engine attempts to access the L2P entry for the address received in step 1702 in the appropriate L2P table in the volatile working memory (e.g., DRAM). Since the job is for randomly accessed data, the system attempts to access the L2P entry for a page address in a fine L2P table for random data in the cache of fine L2P tables, such as random L2P cache 1442. Although all L2P tables are stored in the non-volatile memory, only a subset of L2P tables are stored in the relevant cache. Therefore, when the system attempts to access the L2P entry in the random L2P cache it is possible that the L2P entry is in the cache ("hit") or is not in the cache ("miss"). If the L2P entry for the page address received in step 1702 is not in the cache so that there is a cache miss (step 1710), then in step 1712 the system fetches the L2P table that includes the page address received in step 1702 from non-volatile memory (e.g., from area 1430 of non-volatile memory 1404). In step 1714, the fetched L2P table is stored in the cache (e.g., in random L2P cache 1742). In step 1716, the L2P entry for the page address received in step 1702 that is in the fetched L2P table is used by the controller and/or compute engine to translate the page address received in step 1702 from a logical address to a physical page address in the non-volatile memory. In step 1718, one or more operations are performed on the random data associated with the physical page address from step 1716 in response to the instructions received from the host in step 1702. Step 1718 includes the compute engine performing the one or more database operations based on the compiled code, including performing one or more memory operations on randomly accessed target data where the target data is accessed using the fine logical address to physical address tables (see step 1716) since the indication denotes that the target data is randomly accessed data. Examples of database operations include scanning the data, searching, filtering, sorting, aggregating data, joining data together, as well as other functions on the data. When performing step 1718, the compute engine will use the local working memory as a scratch pad or for other use.

Note that if in step 1710 it is determined that there was a cache hit because the relevant L2P entry was resident in the random L2P cache, then the process proceeds to step 1716 to translate the page address received in step 1702 from the logical address to the physical page address in the non-volatile memory, as described above.

If, in step 1704, the controller and/or compute engine determines that the job is for sequentially accessed data, then in step 1728 the system attempts to access the L2P entry for a block address (or sub-block or word line or other) in a coarse L2P table for sequential data in the cache of coarse L2P tables, such as sequential L2P cache 3140. If the L2P entry for the page address received in step 1702 is not in the cache so that there is a cache miss (step 1730), then in step 1732 the system fetches the L2P table that includes the block address (or sub-block or word line or other) from non-volatile memory (e.g., from area 1430 of non-volatile memory 1404). In step 1734, the fetched L2P table is stored in the cache (e.g., in sequential L2P cache 1440). In step 1736, the L2P entry for the block address received in step 1702 that is in the fetched L2P table is used to translate the block address received in step 1702 from a logical block address to a physical block address in the non-volatile memory. If the address receive in step 1702 is not a block level address, then it is converted into a block address. Note that steps 1716 and 1726 comprise performing address translation for a logical address in the compiled code using coarse L2P tables or fine L2P tables based on the embedded indication.

In step 1738, the compute engine performs the one or more database operations based on the compiled code, including performing one or more memory operations on sequentially accessed target data where the target data was accessed using the coarse logical address to physical address tables (see step 1736) since the indication denotes that the target data is sequentially accessed data. When performing step 1736, the compute engine will use the local working memory as a scratch pad or for other use.

Note that if in step 1730 it is determined that there was a cache hit because the relevant L2P entry was resident in the sequential L2P cache, then the process proceeds to step 1736 to translate the page address received in step 1702 from the logical address to the physical block address (or sub-block or word line or other) in the non-volatile memory, as described above.

In the discussion of step 1732 above, it was assumed that the non-volatile memory stored a full set of fine L2P tables and a full set of coarse L2P tables. In another embodiment, the non-volatile memory stores a full set of fine L2P tables and no (or a subset of) coarse L2P tables. In this latter embodiment, when the system needs to fetch a coarse L2P table in step 3332 it will instead fetch one or more corresponding fine L2P tables and use the fetched one or more corresponding fine L2P tables to generate the needed coarse L2P table on demand (i.e. on the fly). Thus, in one example implementation, the controller is configured to create the coarse logical address to physical address tables for the working memory on demand from the fine logical address to physical address mapping tables in the non-volatile memory.

While the discussion above has focused on a database example, in certain embodiments the principle can be generalized to different host workloads and applications. One embodiment reorganizes the embedded DRAM L2P tables to efficiently support both small block (e.g., 4 KB) writes (e.g., random data operations) and large block writes (100 KB or more) (e.g., sequential data operations). For workloads with a relatively large amount of data requiring large block writes (e.g., sequential data writes), this significantly reduces the amount of DRAM required to hold the L2P cache. One embodiment assumes a workload with these properties: small block (4 KB or so) reads and writes to a relatively small portion of the overall logical address space; and large block (100 KB or more) writes to the remainder of the logical address space, with both large and small random reads. Applications with these properties allow for much more DRAM-efficient mappings for the large block writes: a single mapping entry can represent a much larger region of storage. If the large block writes are performed contiguously to physical storage, the same mapping entry allows small block reads using simple offsets into the large contiguously written block. Examples of applications that exhibit this behavior include: HDFS (Hadoop File System); Databases using Log-Structured Merge (LSM) trees (including, e.g., Cassandra, LevelDB, and RocksDB); Log-structured file systems, such as ZFS and its derivatives; storage software implementations that perform write serialization for optimized RAID and improved flash performance; and scan-heavy analytics applications.

Figure 26:
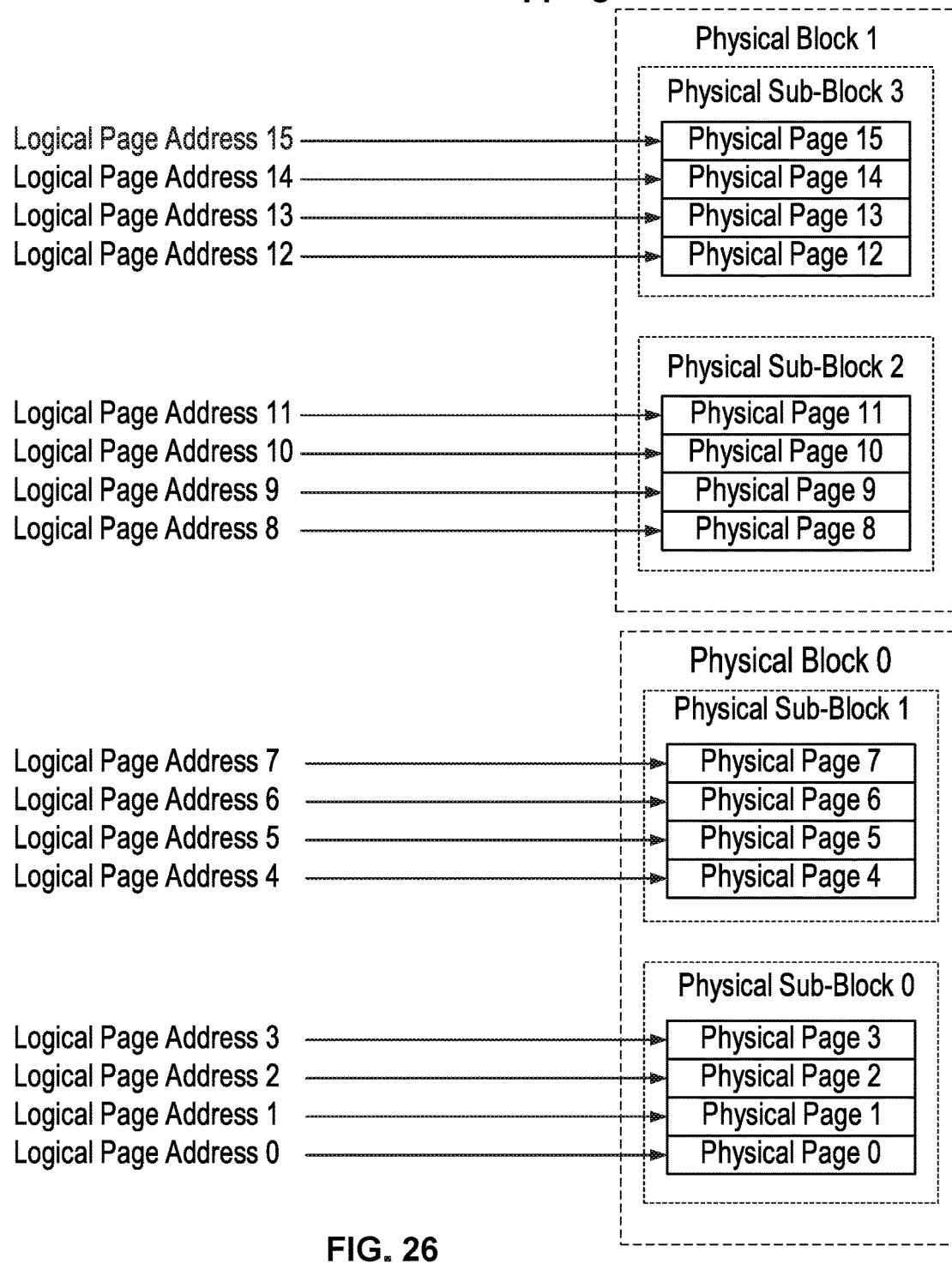
FIG. 26 depicts fine-grained (page based) mapping that has sixteen different map entries (16 physical pages or 2 blocks in total, s sub-blocks/block, 4 pages/sub-block).
Figure 26:
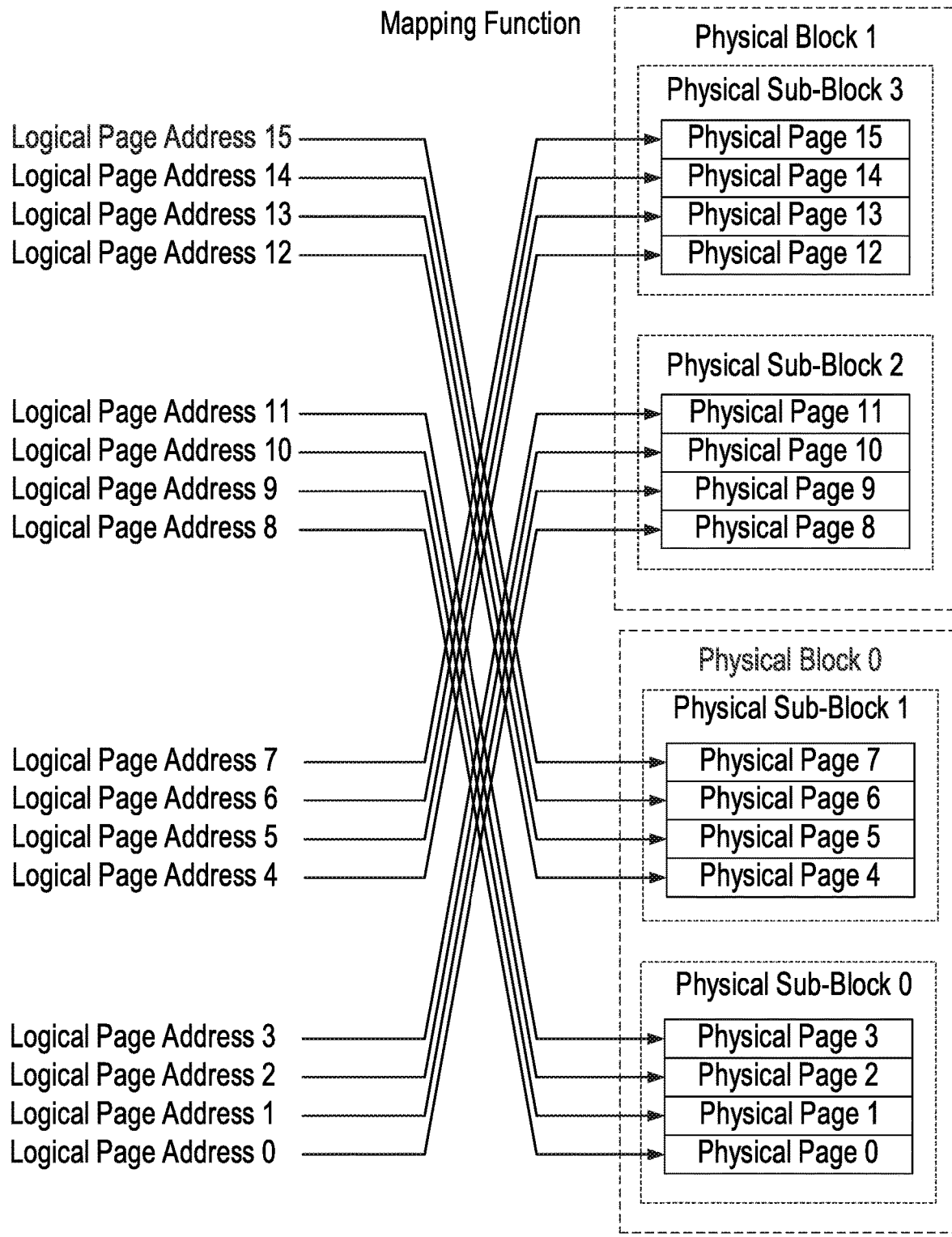
Figure 27:
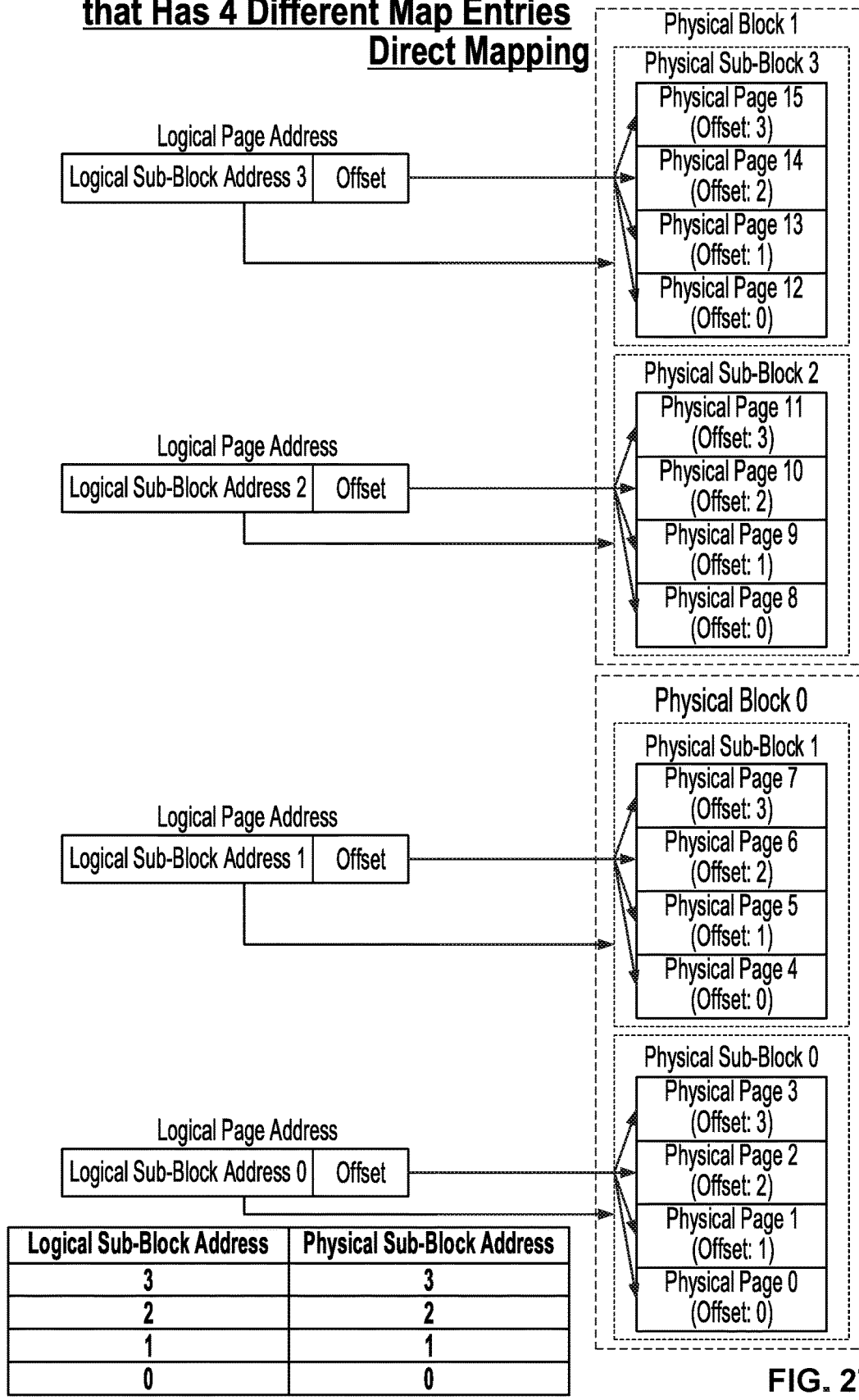
FIG. 27 depicts coarse-grained mapping (sub-block based) that has four different map entries.
Figure 27:
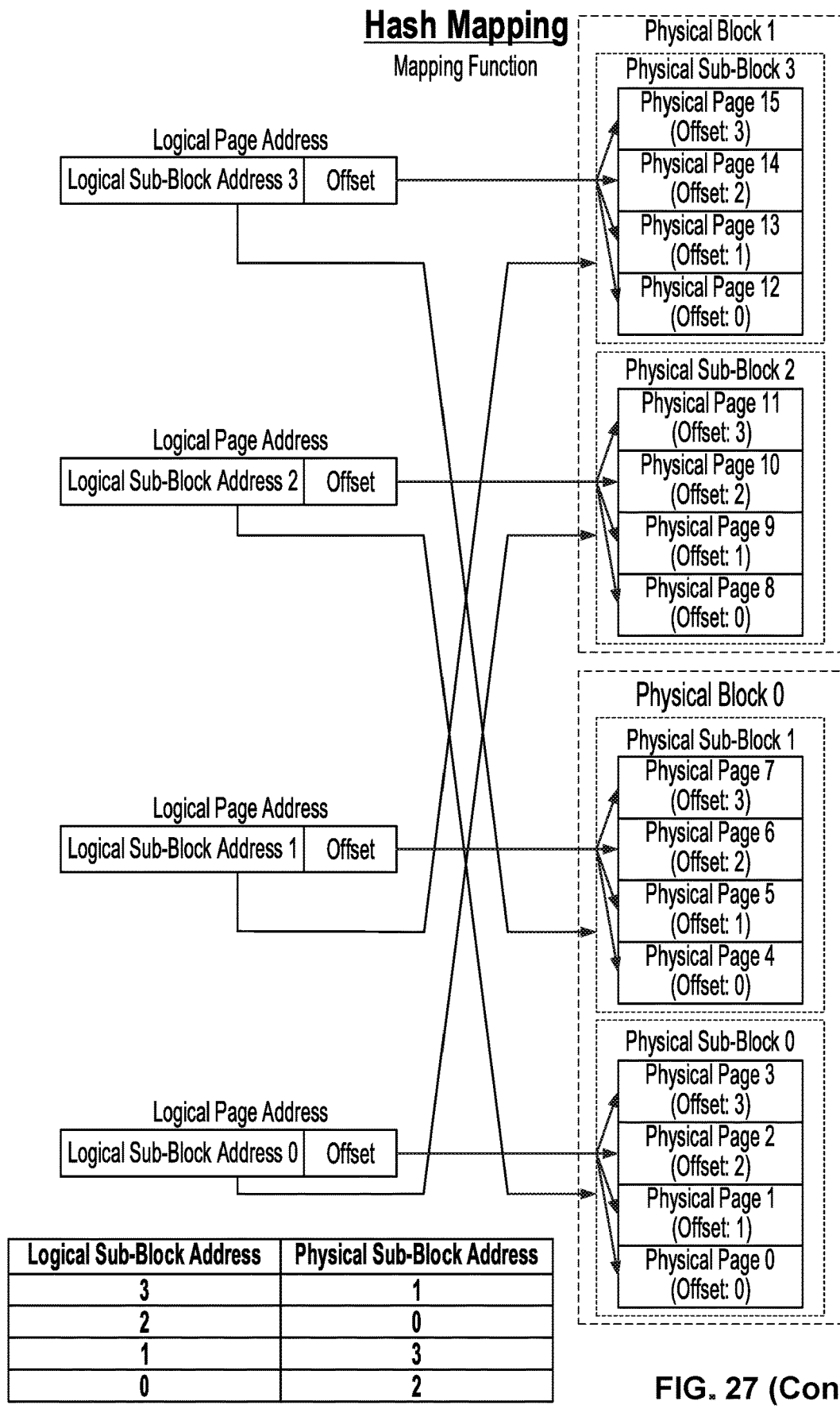
Figure 28:
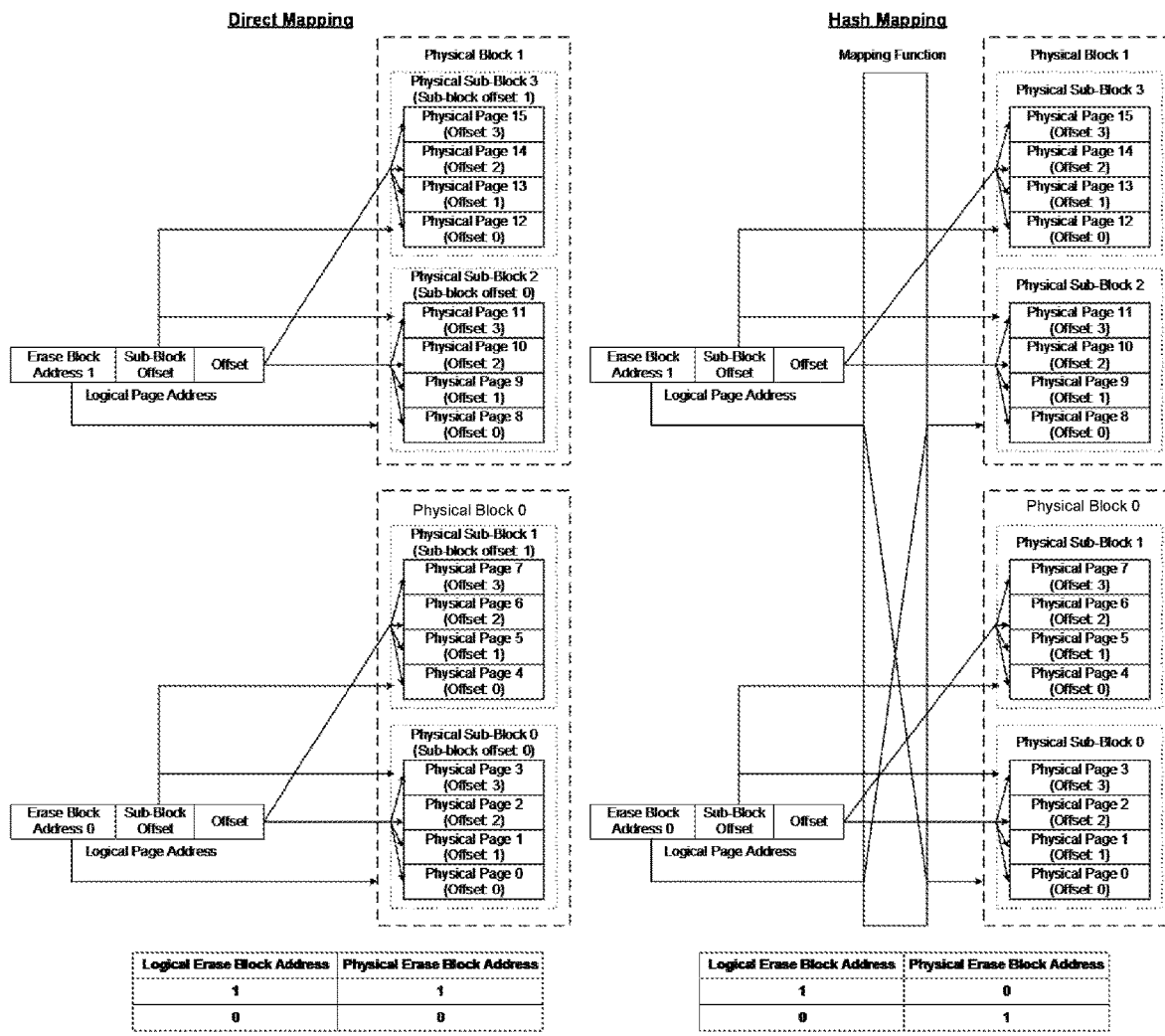
FIG. 28 depicts coarse-grained mapping (erase block based) that has two different map entries.

FIGS. 26-28 depicts L2P tables that can support sequentially accessed data and randomly accessed data, Such tables that supports both small and large block writes can be organized in a variety of ways. These include partitioning for sequentially and randomly written data. FIGS. 26-28 provide more description with examples.

FIG. 26 depicts an embodiment of fine-grained (page based) mapping in a persistent memory that has sixteen different map entries (16 physical pages or 2 blocks in total, s sub-blocks/block, 4 pages/sub-block). The fine-grained (page based) L2P tables of FIG. 26 are for randomly accessed data. FIG. 26 shows blocks divided into two sub-blocks. Each sub-block has a set pages. Each page represents data stored in memory cells connected to a common word line, Two types of mapping are depicted: direct mapping and hash mapping. With direct mapping, logical page addresses are mapped to physical page addresses in sequence. With hash mapping, a hash table is used to map a logical page address to any of the physical page addresses, in any order.

FIG. 27 depicts an embodiment of coarse-grained mapping (sub-block based) that has four different map entries. The logical block address can be mapped to physical block address for sequentially accessed data. FIG. 27 also teaches to use offsets for the logical block addresses and the physical block addresses to access individual pages so that sequentially accessed data can be accessed randomly. Therefore, the controller and/or the compute engine can be configured to perform a random read of data written as sequentially accessed data using a logical block address and an offset. Two types of mapping are depicted: direct mapping and hash mapping. With direct mapping, logical block addresses are mapped to physical block addresses in sequence. With hash mapping, a hash table is used to map a logical block address to any of the physical block addresses, in any order.

FIG. 28 depicts another embodiment of coarse-grained mapping (erase block based) that has two different map entries. The logical block address can be mapped to physical block address for sequentially accessed data. FIG. 28 also teaches to use sub-block offsets and page offsets for the logical page addresses and the physical page addresses to access individual pages so that sequentially accessed data can be accessed randomly. Two types of mapping are depicted: direct mapping and hash mapping.

In one embodiment, fine grained L2P tables (e.g., page address based) are stored in a persistent memory (i.e. NAND flash, ReRAM, PCM, etc.). Logical page addresses can be directly mapped to physical page address, or it can be mapped to certain page addresses through a hash function. In one embodiment, when the table is brought to local working memory (e.g., the L2P cache) for the sequentially written data, the fine grained table is reduced into the coarse grained table which is either of sub-block based or erase block based (or other granularity coarser than page level, as discussed above). For this sequentially written data, logical page addresses can be randomly read through sub-block offset and page offset values in the logical page address with the coarse grained table that stores sub-block or erase block address translation table. As illustrated in FIGS. 26-28, for the case that has 16 physical pages with 2 sub-blocks/block and 4 pages/sub-block, compared to the fine-grained mapping based on page that has 16 different table (also known as a map) entries, coarse-grained mapping based on sub-block or erase block significantly reduce the number of table entries (e.g. 4 for sub-block mapping, 2 for erase-block mapping).

An extent table contains an ordered set of entries mapping variable sized, contiguous regions of logical addresses to physical locations in storage. This would allow the mappings for an arbitrary mix of various sized writes to be kept in a single table. Extent tables of this type can be implemented as a pool of fixed-size records managed as a tree (binary, red-black, B+, etc.) or skip list. Such an organization makes it easy to "page" records between DRAM (the local working memory) and suitable for storage if the entire table cannot fit in DRAM. Other ways to support multiple data sizes in an L2P table should be apparent to someone skilled in the art.

One embodiment includes an apparatus, comprising a memory system. The memory system includes non-volatile memory, a controller in communication with the non-volatile memory, working memory connected to the controller and configured to store a coarse logical address to physical address table for use with storing sequentially accessed data related to database operations and a fine logical address to physical address table for use with storing randomly accessed data related to database operations, and a compute engine positioned within the memory system and in communication with the controller. The compute engine is configured to: receive code from a host, the code including instructions for performing one or more database operations on target data in the non-volatile memory and an indication of whether the target data is sequentially accessed data or randomly accessed data, perform the one or more database operations based on the code, and the target data being accessed using the coarse logical address to physical address table in response to the indication denoting that the target data is sequentially accessed data, perform the one or more database operations based on the code, and the target data being accessed using the fine logical address to physical address table in response to the indication denoting that the target data is randomly accessed data.

In one example implementation, the code received from the host is compiled code that includes the indication of whether the target data is sequentially accessed data or randomly accessed data, the controller includes a host interface, the compute engine is behind the host interface, the host interface receives the compiled code from the host and forwards the compiled code to the compute engine, and the compute engine is configured to use the controller to perform address translation between logical and physical addresses for the target data based on the coarse logical address to physical address tables and the fine logical address to physical address tables in the working memory.

In one example implementation, the non-volatile memory includes a memory package that is separate from and connected to the controller and the memory package includes one or more non-volatile memory dies and the compute engine. Additionally, the compute engine is positioned on a first memory die of the one of the non-volatile memory dies; the code received from the host is compiled code that is received by the compute engine on the first memory die; and the compute engine executes the compiled code to access the target data on the first memory die based on the coarse logical address to physical address tables in the working memory for sequentially accessed and the fine logical address to physical address tables in the working memory for data randomly accessed data.

One embodiment includes a method, comprising: maintaining, in a memory system, reduced size logical to physical (L2P) tables in volatile working memory by maintaining coarse L2P tables in the working memory for use with sequentially accessed data and maintaining fine L2P tables in the working memory for use with randomly accessed data; receiving, by the memory system from a host, compiled code instructing a compute engine within the memory system to perform a set of one or more database operations on target data in the memory system, wherein the compiled code is embedded with an indication of whether the target data is randomly accessed data or sequentially accessed data; using, by the compute engine inside the memory system, the compiled code to perform the set of one or more database operations on the target data using the working memory, including using space in the working memory made available due to reduced size L2P tables, to store working data for the set of one or more database operations; and performing address translation for a logical address in the compiled code using coarse L2P tables or fine L2P tables based on the embedded indication.

One embodiment includes a memory system, comprising: non-volatile memory including a first set of memory cells configured to store branch nodes of a database as randomly accessed data and a second set of memory cells configured to store leaf nodes of the database as sequentially accessed data; working memory; and a controller in communication with the non-volatile memory and the working memory. The controller includes a host interface. The controller is configured to: store a first logical address to physical address table in the working memory for use with storing randomly accessed data in the first set of memory cells and a second logical address to physical address table in the working memory for use with storing sequentially accessed data in the second set of memory cells, the first logical address to physical address table providing address translation at a lower level of granularity than the second logical address to physical address table; receive a request from a host via the host interface, the request including an indication of whether target data of the database to be accessed by the request is sequentially accessed data or randomly accessed data; access the target data from the first set of memory cells using the first logical address to physical address table in response to the request including an indication that the target data is randomly accessed data, and access the target data from the second set of memory cells using the second logical address to physical address table in response to the request including an indication that the target data is sequentially accessed data; and a compute engine that is behind the host interface and is in communication with the controller and the working memory, the compute engine being configured to perform data manipulation operations on sequentially accessed data stored in the second set of memory cells.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:
1. An apparatus, comprising:
 a memory system, comprising:
  non-volatile memory;
  working memory separate from the non-volatile memory, the working memory is configured to store a coarse logical address to physical address table for use with data stored in the non-volatile memory as sequentially accessed data and a fine logical address to physical address table for use with data stored in the non-volatile memory as randomly accessed data;
  a controller in communication with the non-volatile memory and the working memory, the controller includes a processor, the controller is configured to create data for the coarse logical address to physical address table by reading fine logical address to physical address data and reducing the fine logical address to physical address data to coarse logical address to physical address data, the controller is configured to:
   randomly access data stored in the non-volatile memory as randomly accessed data in response to a request from a host by translating a logical address from the host to a physical address in the non-volatile memory using the fine logical address to physical address table in the working memory,
   sequentially access data stored in the non-volatile memory as sequentially accessed data in response to a request from the host by translating a logical address from the host to a physical address in the non-volatile memory using the coarse logical address to physical address table in the working memory, and
   randomly access data stored in the non-volatile memory as sequentially accessed data in response to a request from the host by translating a logical address from the host to a physical address in the non-volatile memory using the coarse logical address to physical address table in the working memory; and a compute engine positioned within the memory system, the compute engine is in communication with the controller and the working memory, the compute engine is different than the processor included in the controller, the compute engine is configured to receive code from the host and perform one or more database operations on target data in the non-volatile memory by executing the code and using the working memory.

2. The apparatus of claim 1, wherein:
the code received from the host is compiled code that includes an indication of whether the target data is sequentially accessed data or randomly accessed data.

3. The apparatus of claim 2, wherein:
the controller includes a host interface;
the compute engine is behind the host interface;
the host interface is configured to receive the compiled code from the host and forward the compiled code to the compute engine; and
the compute engine is further configured to use the controller to perform address translation between logical and physical addresses for the target data based on the coarse logical address to physical address table and the fine logical address to physical address table in the working memory.

4. The apparatus of claim 1, wherein:
the non-volatile memory includes a first portion of non-volatile memory configured to store sequentially accessed data comprising leaf node data for one or more database data structures and a second portion of non-volatile memory configured to store randomly accessed data comprising branch node data for one or more database data structures;
the controller is further configured to use the coarse logical address to physical address table to perform address translation between logical and physical addresses for sequentially accessed data stored in the first portion of non-volatile memory;
the controller is further configured to use the fine logical address to physical address table to perform address translation between logical and physical addresses for randomly accessed data stored in the second portion of non-volatile memory;
the coarse logical address to physical address table is separate from the leaf node data and the branch node data; and
the fine logical address to physical address table is separate from the leaf node data and the branch node data.

5. The apparatus of claim 1, wherein:
the non-volatile memory includes a first portion of non-volatile memory configured to store sequentially accessed data comprising leaf node data for one or more database data structures and a second portion of non-volatile memory configured to store randomly accessed data comprising branch node data for one or more database data structures;
the coarse logical address to physical address table is separate from the leaf node data and the branch node data;
the fine logical address to physical address table is separate from the leaf node data and the branch node data;
the compute engine is further configured to use the coarse logical address to physical address table to perform address translation between logical and physical addresses for sequentially accessed data stored in the first portion of non-volatile memory; and
the compute engine is further configured to use the fine logical address to physical address table to perform address translation between logical and physical addresses for randomly accessed data stored in the second portion of non-volatile memory.

6. The apparatus of claim 1, wherein:
the non-volatile memory includes a first portion of non-volatile memory configured to store leaf nodes of a database as sequentially accessed data and a second portion of non-volatile memory configured to store branch nodes of the database randomly accessed data;
the coarse logical address to physical address table is separate from the leaf nodes and the branch nodes;
the fine logical address to physical address table is separate from the leaf nodes and the branch nodes;
the compute engine is further configured to use the coarse logical address to physical address table to perform address translation between logical and physical addresses for the leaf nodes stored in the first portion of non-volatile memory; and
the compute engine is further configured to use the fine logical address to physical address table to perform address translation between logical and physical addresses for the branch nodes stored in the second portion of non-volatile memory.

7. The apparatus of claim 2, wherein:
wherein the indication of whether the target data is sequentially accessed data or random accessed data is inferred from a type of the one or more database operations specified by the code.

8. The apparatus of claim 1, wherein:
the working memory is volatile memory; and
the compute engine is further configured to use the volatile working memory to store working data for the compute engine while performing the one or more database operations.

9. The apparatus of claim 1, wherein:
the non-volatile memory includes a memory package that is separate from and connected to the controller; and
the memory package includes one or more non-volatile memory dies and the compute engine.

10. The apparatus of claim 9, wherein:
the compute engine is positioned on a first memory die of the one of the non-volatile memory dies;
the code received from the host is compiled code that is received by the compute engine on the first memory die; and
the compute engine is configured to execute the compiled code to access the target data on the first memory die based on
the coarse logical address to physical address table in the working memory for sequentially accessed data, and
the fine logical address to physical address table in the working memory for data randomly accessed data.

11. The apparatus of claim 1, wherein:
the memory system is a solid state drive; and
the controller includes a host interface, the compute engine is in the solid state drive and behind the host interface.

12. The apparatus of claim 1, wherein:
the controller includes a host interface, the compute engine is behind the host interface, the compute engine is further configured to use the working memory to store working data for the compute engine while performing the one or more database operations;

the code received from the host is compiled code that includes an indication of whether the target data is sequentially accessed data or randomly accessed data;

the non-volatile memory includes a first portion of non-volatile memory configured to store sequentially accessed data and a second portion of non-volatile memory configured to store randomly accessed data;

the compute engine is further configured to use the coarse logical address to physical address table to perform address translation between logical and physical addresses for sequentially accessed data stored in the first portion of non-volatile memory; and the compute engine is further configured to use the fine logical address to physical address table to perform address translation between logical and physical addresses for randomly accessed data stored in the second portion of non-volatile memory.

13. The apparatus of claim 1, wherein:
the non-volatile memory includes blocks of memory cells that are configured to be divided into pages;
entries in the coarse logical address to physical address table are at a block level; and
entries in the fine logical address to physical address table are at a page level.

14. The apparatus of claim 1, wherein:
the non-volatile memory is configured to store a set of address translation information;
the fine logical address to physical address table is a first cache of the set of address translation information in the non-volatile memory;
the coarse logical address to physical address table is a second cache of the set of address translation information in the non-volatile memory; and
the controller is further configured to create data for the second cache in the working memory by reading fine data of the set of address translation information in the non-volatile memory, reducing the fine data to coarse data, and storing the coarse data in the second cache in the working memory.

15. A method, comprising:
storing data written as sequentially accessed data in non-volatile memory of a memory system;
storing data written as randomly accessed data in the non-volatile memory of the memory system;
maintaining one or more logical to physical (L2P) tables in the non-volatile memory of the memory system for translating logical addresses to physical addresses for the stored data written as sequentially accessed data in the non-volatile memory of the memory system and for translating logical addresses to physical addresses for the stored data written as randomly accessed data in the non-volatile memory of the memory system;
maintaining a coarse L2P cache in a volatile working memory of the memory system to store a subset of entries in the one or more L2P tables for translating logical addresses to physical addresses for the stored data written as sequentially accessed data in the non-volatile memory of the memory system;
maintaining a fine L2P cache in the volatile working memory of the memory system to store a subset of entries in the one or more L2P tables for translating logical addresses to physical addresses for the stored data written as randomly accessed data in the non-volatile memory of the memory system;

creating data for the coarse L2P cache in the volatile working memory by reading fine L2P data from the one or more L2P tables, reducing the fine L2P data to coarse L2P data and storing the coarse L2P data in the coarse L2P cache;

receiving, by the memory system from a host, code that includes instructions for programming a compute engine within the memory system to perform a set of one or more database operations on target data in the non-volatile memory of the memory system;

executing, by the compute engine inside the memory system, the code to perform the set of one or more database operations on the target data using the volatile working memory; and performing an address translation for a logical address associated with the one or more database operations using the coarse L2P cache or the fine L2P cache.

16. The method of claim 15, wherein:
the coarse L2P cache stores translation entries at a block level; and
the fine L2P cache stores translation entries at a page level.

17. The method of claim 16, wherein:
the storing data written as sequentially accessed data comprises storing leaf nodes of a database in the non-volatile memory of the memory system; and
the storing data written as randomly accessed data comprises storing branch nodes of the database in the non-volatile memory of the memory system, the branch nodes point to the leaf nodes, the branch nodes and the leaf nodes are separate from the coarse L2P cache and the fine L2P cache.

18. The method of claim 15, further comprising:
randomly accessing data written as sequentially accessed data in the non-volatile memory of the memory system in response to a host by translating a logical address to a physical address in the non-volatile memory using the coarse L2P cache in the volatile working memory.

19. A memory system, comprising:
non-volatile memory configured to store a database comprising leaf nodes and branch nodes pointing to the leaf nodes in blocks of memory cells, the blocks of memory cells are divided into pages, the non-volatile memory comprises a first set of memory cells configured to store the branch nodes of the database as randomly accessed data in pages and a second set of memory cells configured to store the leaf nodes of the database as sequentially accessed data in pages;
working memory separate from the non-volatile memory; and
a controller in communication with the non-volatile memory and the working memory, the controller including a host interface and a processor, the controller being configured to:
store a first logical address to physical address table in the working memory for accessing the branch nodes in the first set of memory cells and a second logical address to physical address table in the working memory for accessing the leaf nodes in the second set of memory cells, the first logical address to physical address table and the second logical address to physical address table are separate from the database,
create data for the second logical address to physical address table by reading fine logical address to physical address data and reducing the fine logical address to physical address data to coarse logical address to physical address data receive a request from a host via the host interface, the request including an indication of target data of the database to be accessed, access the target data from the first set of memory cells using the first logical address to physical address table in response to the request if the target data is randomly accessed data, and access the target data from the second set of memory cells using the second logical address to physical address table in response to the request if the target data is sequentially accessed data; and a compute engine that is behind the host interface and is in communication with the controller and the working memory, the compute engine is separate from the processor of the controller, the compute engine being configured to perform data manipulation operations on sequentially accessed data stored in the second set of memory cells using the working memory to store working data for the compute engine while performing the data manipulation operations.

* * * * *